US010260020B2

(12) United States Patent
Seemeyer et al.

(10) Patent No.: US 10,260,020 B2
(45) Date of Patent: Apr. 16, 2019

(54) CONVEYOR LUBRICANTS INCLUDING EMULSIONS AND METHODS EMPLOYING THEM

(71) Applicant: Ecolab USA Inc., St. Paul, MN (US)

(72) Inventors: Stefan Seemeyer, Solingen (DE); Stephan Scharrenbach, Monheim am Rhein (DE); Jeffrey S. Hutchinson, Stillwater, MN (US); Eric Daniel Morrison, West St. Paul, MN (US); Jason Gregory Lang, Bloomington, MN (US); Kellan Wesley Chamblee, Falcon Heights, MN (US); Chad Aaron Thompson, Farmington, MN (US)

(73) Assignee: Ecolab USA Inc., St. Paul, MN (US)

(*) Notice: Subject to any disclaimer, the term of this patent is extended or adjusted under 35 U.S.C. 154(b) by 0 days.

(21) Appl. No.: 15/861,926

(22) Filed: Jan. 4, 2018

(65) Prior Publication Data
US 2018/0127679 A1 May 10, 2018

Related U.S. Application Data

(63) Continuation of application No. 15/150,880, filed on May 10, 2016, now Pat. No. 9,896,641, which is a continuation of application No. 13/240,096, filed on Sep. 22, 2011, now Pat. No. 9,359,579.

(60) Provisional application No. 61/386,292, filed on Sep. 24, 2010.

(51) Int. Cl.
| *C10M 173/02* | (2006.01) |
| *C10M 129/26* | (2006.01) |
| *C10M 133/06* | (2006.01) |
| *C10M 137/04* | (2006.01) |
| C10M 133/54 | (2006.01) |
| C10M 169/04 | (2006.01) |
| C10M 133/04 | (2006.01) |
| C10M 125/10 | (2006.01) |
| B65G 45/02 | (2006.01) |

(52) U.S. Cl.
CPC ...... *C10M 173/025* (2013.01); *C10M 129/26* (2013.01); *C10M 133/06* (2013.01); *C10M 137/04* (2013.01); *B65G 45/02* (2013.01); C10M 125/10 (2013.01); C10M 133/04 (2013.01); C10M 133/54 (2013.01); C10M 169/04 (2013.01); C10M 2207/10 (2013.01); C10M 2215/04 (2013.01); C10M 2223/04 (2013.01); C10M 2229/025 (2013.01); C10N 2220/022 (2013.01); C10N 2220/082 (2013.01); C10N 2230/02 (2013.01); C10N 2230/06 (2013.01); C10N 2240/52 (2013.01)

(58) Field of Classification Search
CPC .............. C10M 125/10; C10M 133/04; C10M 133/54; C10M 169/04; C10M 173/025; C10M 2229/022; C10M 2215/04; C10M 2223/04; C10M 2229/025; B65G 45/02; C10N 2220/022; C10N 2220/082; C10N 2230/02; C10N 2230/06; C10N 2240/52
See application file for complete search history.

(56) References Cited

U.S. PATENT DOCUMENTS

| 3,011,975 A | 12/1961 | Nitzsche et al. |
| 3,213,024 A | 10/1965 | Blake et al. |
| 3,514,314 A | 5/1970 | Nemeth |
| 3,664,956 A | 5/1972 | Messina et al. |
| 3,853,607 A | 12/1974 | Iyengar et al. |
| 3,981,812 A | 9/1976 | Zeitz |
| 4,062,785 A | 12/1977 | Nibert |
| 4,065,590 A | 12/1977 | Salensky |
| 4,069,933 A | 1/1978 | Newing |
| 4,083,791 A | 4/1978 | Elliott et al. |
| 4,105,716 A | 8/1978 | Sakai et al. |
| 4,132,657 A | 1/1979 | Verdicchio et al. |
| 4,149,624 A | 4/1979 | Douty et al. |
| 4,162,347 A | 7/1979 | Montgomery |
| 4,165,291 A | 8/1979 | Gragson |
| 4,197,937 A | 4/1980 | Sanford et al. |
| 4,225,450 A | 9/1980 | Rosenberger |
| 4,248,724 A | 2/1981 | Macintosh |
| 4,252,528 A | 2/1981 | Decker et al. |
| 4,260,499 A | 4/1981 | Fein et al. |
| 4,262,776 A | 4/1981 | Wilson et al. |
| 4,264,650 A | 4/1981 | Schulze et al. |
| 4,274,973 A | 6/1981 | Stanton et al. |
| 4,289,671 A | 9/1981 | Hernandez |
| 4,324,671 A | 4/1982 | Christian et al. |
| 4,343,616 A | 8/1982 | Decker et al. |
| 4,375,444 A | 3/1983 | Deeken |
| 4,420,578 A | 12/1983 | Hagens et al. |
| 4,436,200 A | 3/1984 | Hodlewsky et al. |
| 4,478,889 A | 10/1984 | Maruhashi et al. |
| 4,486,378 A | 12/1984 | Hirata et al. |
| 4,515,836 A | 5/1985 | Cobbs, Jr. et al. |
| 4,525,377 A | 6/1985 | Nickel et al. |
| 4,534,995 A | 8/1985 | Pocock et al. |
| 4,537,285 A | 8/1985 | Brown et al. |

(Continued)

FOREIGN PATENT DOCUMENTS

| AU | 495911 | 7/1977 |
| CA | 1 157 456 A1 | 11/1983 |

(Continued)

OTHER PUBLICATIONS

US 5,863,871 A, 01/1999, Besse (withdrawn)

(Continued)

*Primary Examiner* — Taiwo Oladapo
(74) *Attorney, Agent, or Firm* — Merchant & Gould P.C.

(57) ABSTRACT

The present disclosure relates to conveyor lubricant compositions including an emulsion. The present disclosure also relates to methods of employing such lubricant compositions. In an embodiment, the methods include applying the present lubricant composition to a conveyor with a non-energized nozzle. In an embodiment, the methods include applying the present lubricant composition in a "semi-dry" mode.

15 Claims, No Drawings

(56) References Cited

U.S. PATENT DOCUMENTS

| | | |
|---|---|---|
| 4,538,542 A | 9/1985 | Kennon et al. |
| 4,543,909 A | 10/1985 | Sharpless |
| 4,555,543 A | 11/1985 | Effenberger et al. |
| 4,569,869 A | 2/1986 | Kushida et al. |
| 4,573,429 A | 3/1986 | Cobbs, Jr. et al. |
| 4,604,220 A | 8/1986 | Stanton |
| 4,632,053 A | 12/1986 | Villaueva et al. |
| 4,690,299 A | 9/1987 | Cannon |
| 4,699,809 A | 10/1987 | Maruhashi et al. |
| 4,714,580 A | 12/1987 | Maruhahi et al. |
| 4,719,022 A | 1/1988 | Hyde |
| 4,731,266 A | 3/1988 | Bonnebat et al. |
| 4,769,162 A | 9/1988 | Remus |
| 4,828,727 A | 5/1989 | Mcaninch |
| 4,851,287 A | 7/1989 | Hartsing, Jr. |
| 4,855,162 A | 8/1989 | Wrasidlo et al. |
| 4,867,890 A | 9/1989 | Colclough et al. |
| 4,874,647 A | 10/1989 | Yatsu et al. |
| 4,877,111 A | 10/1989 | Kilper |
| 4,919,984 A | 4/1990 | Maruhashi et al. |
| 4,929,375 A | 5/1990 | Rossio et al. |
| 4,980,211 A | 12/1990 | Kushida et al. |
| 4,995,993 A | 2/1991 | Papke et al. |
| 5,001,935 A | 3/1991 | Tekkanat et al. |
| 5,009,801 A | 4/1991 | Wider et al. |
| 5,032,301 A | 7/1991 | Pawloski et al. |
| 5,073,280 A | 12/1991 | Rossio et al. |
| 5,104,559 A | 4/1992 | Pawloski et al. |
| 5,115,047 A | 5/1992 | Hashimoto et al. |
| 5,145,721 A | 9/1992 | Kojima et al. |
| 5,160,646 A | 11/1992 | Scheld |
| 5,174,914 A | 12/1992 | Gutzmann |
| 5,182,035 A | 1/1993 | Schmidt et al. |
| 5,202,037 A | 4/1993 | Lavelle et al. |
| 5,209,860 A | 5/1993 | Trivett |
| 5,238,718 A | 8/1993 | Yano et al. |
| 5,244,589 A | 9/1993 | Liu et al. |
| 5,317,061 A | 5/1994 | Chu et al. |
| 5,334,322 A | 8/1994 | Williams, Jr. |
| RE34,742 E | 9/1994 | Maier et al. |
| 5,352,376 A | 10/1994 | Gutzmann |
| 5,371,112 A | 12/1994 | Sayre et al. |
| 5,391,308 A | 2/1995 | Despo |
| 5,411,672 A | 5/1995 | Kagaya et al. |
| 5,441,654 A | 8/1995 | Rossio |
| 5,474,692 A | 12/1995 | Laufenberg et al. |
| 5,509,965 A | 4/1996 | Harry et al. |
| 5,510,045 A | 4/1996 | Remus |
| 5,559,087 A | 9/1996 | Halsrud et al. |
| 5,565,127 A | 10/1996 | Laufenberg et al. |
| 5,573,819 A | 11/1996 | Nugent, Jr. et al. |
| 5,584,201 A | 12/1996 | Graham et al. |
| 5,652,034 A | 7/1997 | Seiner |
| 5,658,619 A | 8/1997 | Kirschner et al. |
| 5,663,131 A | 9/1997 | Winicov et al. |
| 5,670,463 A | 9/1997 | Maples |
| 5,672,401 A | 9/1997 | Anglin et al. |
| 5,681,628 A | 10/1997 | Niederst et al. |
| 5,698,269 A | 12/1997 | Carlblom et al. |
| 5,721,023 A | 2/1998 | Ostapchenko |
| 5,723,418 A | 3/1998 | Person Hei et al. |
| 5,728,770 A | 3/1998 | Yamamoto et al. |
| 5,747,431 A | 5/1998 | Taylour et al. |
| 5,758,761 A | 6/1998 | Selbertinger et al. |
| 5,783,303 A | 7/1998 | Tsuei |
| 5,789,459 A | 8/1998 | Inagaki et al. |
| 5,863,874 A | 1/1999 | Person Hei et al. |
| 5,871,590 A | 2/1999 | Hei et al. |
| 5,876,812 A | 3/1999 | Frisk et al. |
| 5,925,601 A | 7/1999 | McSherry et al. |
| 5,932,526 A | 8/1999 | Person Hei et al. |
| 5,935,914 A | 8/1999 | Theyssen et al. |
| 5,952,601 A | 9/1999 | Sanford et al. |
| 6,060,444 A | 5/2000 | Schulz et al. |
| 6,087,308 A | 7/2000 | Butler et al. |
| 6,096,692 A | 8/2000 | Hagihara et al. |
| 6,207,622 B1 | 3/2001 | Li et al. |
| 6,214,777 B1 | 4/2001 | Li et al. |
| 6,288,012 B1 | 9/2001 | Li et al. |
| 6,372,698 B1 | 4/2002 | Strothoff et al. |
| 6,427,826 B1 | 8/2002 | Li et al. |
| 6,495,494 B1 | 12/2002 | Li et al. |
| 6,509,302 B2 | 1/2003 | Li et al. |
| 6,541,430 B1 | 4/2003 | Beatty |
| 6,569,816 B2 | 5/2003 | Oohira et al. |
| 6,576,298 B2 | 6/2003 | Bennett et al. |
| 6,653,263 B1 | 11/2003 | Küpper et al. |
| 6,667,283 B2 | 12/2003 | Kravitz et al. |
| 6,673,753 B2 | 1/2004 | Person Hei et al. |
| 6,677,280 B2 | 1/2004 | Küpper et al. |
| 6,688,434 B2 | 2/2004 | Johnson et al. |
| 6,696,394 B1 | 2/2004 | Ruhr et al. |
| 6,743,758 B2 | 6/2004 | Li et al. |
| 6,780,823 B2 | 8/2004 | Li et al. |
| 6,806,240 B1 | 10/2004 | Hei et al. |
| 6,809,068 B1 | 10/2004 | Küpper et al. |
| 6,821,568 B2 | 11/2004 | Bennett et al. |
| 6,855,676 B2 | 2/2005 | Li et al. |
| 6,933,263 B2 | 8/2005 | Manka et al. |
| 6,962,897 B2 | 11/2005 | Küpper |
| 6,967,189 B2 | 11/2005 | Li et al. |
| 7,109,152 B1 | 9/2006 | Corby et al. |
| 7,125,827 B2 | 10/2006 | Li et al. |
| 7,297,666 B2 | 11/2007 | Küpper |
| 7,384,895 B2 | 6/2008 | Person Hei et al. |
| 7,462,584 B2 | 12/2008 | Küpper |
| 7,524,797 B1 | 4/2009 | Perez, Jr. et al. |
| 7,651,984 B2 | 1/2010 | Cook et al. |
| 7,727,941 B2 | 6/2010 | Morrison et al. |
| 7,741,255 B2 | 6/2010 | Morrison et al. |
| 7,741,257 B2 | 6/2010 | Valencia Sil et al. |
| 7,745,381 B2 | 6/2010 | Valencia Sil et al. |
| 7,915,206 B2 | 3/2011 | Morrison et al. |
| 2002/0025912 A1 | 2/2002 | Person Hei et al. |
| 2003/0073589 A1 | 4/2003 | Li et al. |
| 2003/0207040 A1 | 11/2003 | Bennett et al. |
| 2003/0220205 A1 | 11/2003 | Manka et al. |
| 2004/0029741 A1 | 2/2004 | Corby et al. |
| 2004/0053791 A1 | 3/2004 | Langer et al. |
| 2004/0058829 A1 | 3/2004 | Hei et al. |
| 2004/0097382 A1 | 5/2004 | Li et al. |
| 2004/0102337 A1 | 5/2004 | Li et al. |
| 2004/0235680 A1 | 11/2004 | Lawrence et al. |
| 2005/0059564 A1 | 3/2005 | Li et al. |
| 2005/0070448 A1 | 3/2005 | Küpper |
| 2006/0211583 A1 | 9/2006 | Valencia Sil et al. |
| 2006/0211584 A1 | 9/2006 | Court et al. |
| 2007/0066496 A1 | 3/2007 | Morrison et al. |
| 2007/0066497 A1 | 3/2007 | Morrison et al. |
| 2007/0298981 A1 | 12/2007 | Morrison et al. |
| 2008/0108532 A1 | 5/2008 | Kuepper et al. |
| 2008/0176778 A1* | 7/2008 | Seemeyer .......... C10M 173/025 508/433 |
| 2009/0017243 A1 | 1/2009 | Person Hei et al. |
| 2009/0192061 A1 | 7/2009 | Boegner et al. |
| 2009/0253598 A1 | 10/2009 | Theyssen et al. |
| 2011/0269653 A1 | 11/2011 | Praeckel et al. |
| 2012/0073907 A1 | 3/2012 | Seemeyer et al. |
| 2012/0241289 A1 | 9/2012 | Valencia Sil et al. |

FOREIGN PATENT DOCUMENTS

| | | |
|---|---|---|
| DE | 199 42 535 A1 | 3/2001 |
| DE | 10 2006 038 311 | 2/2008 |
| EP | 0 359 330 A2 | 3/1990 |
| EP | 0 684 981 B1 | 3/1997 |
| EP | 0 844 299 A1 | 5/1998 |
| EP | 0 767 825 B1 | 9/1998 |
| EP | 0 670 675 B1 | 3/1999 |
| EP | 1 001 005 A1 | 5/2000 |
| EP | 0 883 668 B1 | 10/2001 |
| EP | 1 308 393 B1 | 2/2005 |
| EP | 1 474 501 B1 | 7/2006 |

(56) References Cited

FOREIGN PATENT DOCUMENTS

| | | |
|---|---|---|
| EP | 0 797 652 B1 | 8/2006 |
| EP | 1 690 920 A1 | 8/2006 |
| EP | 1 214 387 B1 | 7/2007 |
| EP | 1 204 730 B1 | 8/2007 |
| EP | 1 840 196 A1 | 10/2007 |
| EP | 1 842 898 A1 | 10/2007 |
| EP | 1 932 901 A1 | 6/2008 |
| EP | 1 334 914 B1 | 10/2008 |
| EP | 2 105 493 A1 | 9/2009 |
| EP | 2 105 494 A1 | 9/2009 |
| GB | 1 564 128 A | 4/1980 |
| JP | 57003892 | 1/1982 |
| JP | S58125513 | 7/1983 |
| JP | 62-129388 | 6/1987 |
| JP | 6136377 | 5/1994 |
| JP | 7247293 | 9/1995 |
| JP | 7268380 | 10/1995 |
| JP | 10053679 | 2/1998 |
| JP | 10059523 | 3/1998 |
| JP | 10-511139 | 10/1998 |
| JP | 20011517938 | 10/2001 |
| JP | 2003181388 | 7/2003 |
| JP | 2002-275483 | 9/2003 |
| JP | 2004508173 | 3/2004 |
| JP | 2004508253 | 3/2004 |
| JP | 2004217866 | 5/2004 |
| JP | 2009526121 | 7/2009 |
| JP | 2010503747 | 2/2010 |
| JP | 2004518013 | 6/2014 |
| NL | 9300742 | 12/1993 |
| WO | WO92/13048 A1 | 8/1992 |
| WO | WO94/01517 A1 | 1/1994 |
| WO | WO96/08601 A1 | 3/1996 |
| WO | WO97/45508 A1 | 12/1997 |
| WO | WO98/51746 A1 | 11/1998 |
| WO | WO98/59023 A1 | 12/1998 |
| WO | WO01/07544 A1 | 2/2001 |
| WO | WO01/07554 A1 | 2/2001 |
| WO | WO01/12759 A1 | 2/2001 |
| WO | WO02/20381 A1 | 3/2002 |
| WO | WO 03035268 | 5/2003 |
| WO | WO03/078557 A2 | 9/2003 |
| WO | WO2005/014764 A1 | 2/2005 |
| WO | WO2006/009421 A2 | 1/2006 |
| WO | WO2006/017503 A1 | 2/2006 |
| WO | WO2006/088658 A1 | 8/2006 |
| WO | WO2006/101609 A1 | 9/2006 |
| WO | WO2007/040677 A1 | 4/2007 |
| WO | WO2007/040678 A1 | 4/2007 |
| WO | WO2007/090018 A1 | 8/2007 |
| WO | WO2007/094980 A2 | 8/2007 |
| WO | WO2007/112917 A2 | 10/2007 |
| WO | WO2008/032284 A2 | 3/2008 |
| WO | WO2008/032284 A3 | 3/2008 |
| WO | WO2008/073951 A1 | 6/2008 |
| WO | WO2009/120751 A2 | 10/2009 |
| WO | WO2009/120768 A1 | 10/2009 |
| WO | WO2007/149175 A2 | 12/2012 |

OTHER PUBLICATIONS

U.S. Appl. No. 60/149,048, filed Aug. 16, 1999, Hei.
U.S. Appl. No. 60/149,095, filed Aug. 16, 1999, Hei.
U.S. Appl. No. 60/230,662, filed Sep. 7, 2000, Bennett.
European Search Report, PCT/IB2011054184, dated Apr. 1, 2015.
European Search Report of EP03076177 dated Jul. 17, 2003, 2 pgs.
International Search Report of EP03076178 dated Jun. 12, 2003, 2 pgs.
Dow Corning "Emulsion" [Online], 1998, XP002463027, URL: http://www2.dowcorning.com/DataFiles/090007c880001bdc.pdf, Dec. 19, 2007, 2 pgs.
Dupont, "Krytox® Dry Film Lubricants", Nov. 1997, 6 pgs.
Ecolab, "Lube Application to Conveyor Surface/Containers", Jun. 13, 2000, 7 pgs.
Gangal, "Polytetrafluoroethylene", Encyclopedia of Chemical Technology, (Jun. 27, 1994), 4th Ed., vol. 11, pp. 621-644, 25 pgs.
Gilbert, "Conveyor Lubrication in Dairies, Breweries and Beverage Plants", Klensan (Pty) Ltd., S.A. Food Review—Dec. 1981/Jan. 1982, pp. 27-28, 2 pages.
Gorton et al. C Chem, "The Development of New Conveyor Lubricant Technology", MBAA Technical Quarterly, vol. 30, pp. 18-22, 1993, 5 pages.
Henkel Ecolab, "Conveyor Lubrication", 27 Food Ireland, 1 page.
Interflon, "Fin Food Lube AL. High Penetration Teflon® Lubricating Agent Especially Suitable for Automatic Lubrication Systems for the Food Processing Industry", 1998, 20 pgs.
Interflon, Maintenance Products with Teflon®, http://www.interflon.nl/engels.htm, Jun. 18, 1999, 10 pgs.
International Search Report and Written Opinion for PCT/US2014/022504 dated Jun. 20, 2014, 15 pages.
International Search Report and Written Opinion dated Jun. 26, 2012 (8 pages).
Lubranol DWS Hybrid Lube Innovative Track Treatment, Sopura, 2 pages (date unknown).
Moskala, "Environmental Stress Cracking in PET Beverage Containers", BEV-PAK Americas '96, Apr. 15-16, 1996, 14 pgs.
Moskala, "Environmental Stress Cracking in PET Carbonated Soft Drink Containers", Bev Tech 98, Mar. 30-Apr. 1, 1998, 22 pgs.
Packaging Hygiene "Maintaining hygiene on filler line conveyor track", 2 pages.
Report on the Filing or Determination of an Action Regarding a Patent or Trademark with attached Complaint from the Middle District of Florida, Case 6:10-cv-01208-ACC-GJK, Aug. 13, 2010, 17 pages.
Synco Chemical Corporation, "Other Super Lube Products . . . What is Super Lube®?" http://www.super-lube.com, May 5, 1999, 5 pgs.
Stachura et al., "Conveyor Lubrication in a Sustainable World," Sopura, 14 pages (date unknown).
Tekkanat et al., "Environmental Stress Cracking Resistance of Blow Molded Poly(Ethylene Terephthalate) Containers", Polymer Engineering and Science, vol. 32, No. 6, Mar. 1992, pp. 393-397, 5 pgs.
6:10-cv-01208-ACC-GJK, Ecolab v. ICC, USDC, Middle Dist. of FL: Docket Sheet, 2 pages, printed Feb. 13, 2012.
6:10-cv-01208-ACC-GJK, Ecolab v. ICC, USDC, Middle Dist. of FL: Civil Cover Sheet, 1 page, Aug. 13, 2010.
6:10-cv-01208-ACC-GJK, Ecolab v. ICC, USDC, Middle Dist. of FL: Complaint with Exhibits A-K, 58 pages, Aug. 13, 2010.
6:10-cv-01208-ACC-GJK, Ecolab v. ICC, USDC, Middle Dist. of FL: Patent/Trademark Report, 1 page, Aug. 13, 2010.
6:10-cv-01208-ACC-GJK, Ecolab v. ICC, USDC, Middle Dist. of FL: Related case/Interested persons/ECF-2, 8 pages, Aug. 30, 2010.
6:10-cv-01208-ACC-GJK, Ecolab v. ICC, USDC, Middle Dist. of FL: Notice of Pendency of Related Cases, 2 pages, Sep. 15, 2010.
6:10-cv-01208-ACC-GJK, Ecolab v. ICC, USDC, Middle Dist. of FL: Certificate of Interested Persons and Corporate Disclosure Statement, 12 pages, Sep. 15, 2010.
6:10-cv-01208-ACC-GJK, Ecolab v. ICC, USDC, Middle Dist. of FL: Defendant's Motion to Dismiss, 8 pages, Feb. 14, 2011.
6:10-cv-01208-ACC-GJK, Ecolab v. ICC, USDC, Middle Dist. of FL: Amended Complaint with Exhibits A-L, 66 pages, Feb. 18, 2011.
6:10-cv-01208-ACC-GJK, Ecolab v. ICC, USDC, Middle Dist. of FL: Motion to Dismiss, 25 pages, Mar. 4, 2011.
6:10-cv-01208-ACC-GJK, Ecolab v. ICC, USDC, Middle Dist. of FL: Response to Motion, 21 pages, Mar. 18, 2011.
6:10-cv-01208-ACC-GJK, Ecolab v. ICC, USDC, Middle Dist. of FL: Defendant's Brief, 4 pages, Apr. 19, 2011.
6:10-cv-01208-ACC-GJK, Ecolab v. ICC, USDC, Middle Dist. of FL: Order on Motion to Dismiss, 7 pages, Sep. 27, 2011.
6:10-cv-01208-ACC-GJK, Ecolab v. ICC, USDC, Middle Dist. of FL: Motion for Reconsideration, 4 pages, Oct. 6, 2011.
6:10-cv-01208-ACC-GJK, Ecolab v. ICC, USDC, Middle Dist. of FL: Answer to Complaint, 13 pages, Oct. 11, 2011.
6:10-cv-01208-ACC-GJK, Ecolab v. ICC, USDC, Middle Dist. of FL: Response in Opposition to Motion, 6 pages, Oct. 24, 2011.
6:10-cv-01208-ACC-GJK, Ecolab v. ICC, USDC, Middle Dist. of FL: Order on Motion for Reconsideration, 4 pages, Nov. 1, 2011.

(56) References Cited

OTHER PUBLICATIONS

6:10-cv-01208-ACC-GJK, *Ecolab* v. *ICC, USDC*, Middle Dist. of FL: Answer to Amended Complaint, 38 pages, Nov. 8, 2011.
6:10-cv-01208-ACC-GJK, *Ecolab* v. *ICC, USDC*, Middle Dist. of FL: Motion to Dismiss, 20 pages, Dec. 2, 2011.
6:10-cv-01208-ACC-GJK, *Ecolab* v. *ICC, USDC*, Middle Dist. of FL: Second Amended Complaint with Exhibits A-M, 77 pages, Dec. 8, 2011.
6:10-cv-01208-ACC-GJK, *Ecolab* v. *ICC, USDC*, Middle Dist. of FL: Answer to Second Amended Complaint, 37 pages, Dec. 29, 2011.
6:10-cv-01208-ACC-GJK, *Ecolab* v. *ICC, USDC*, Middle Dist. of FL: Motion to Dismiss, 21 pages, Jan. 11, 2012.
6:10-cv-01208-ACC-GJK, *Ecolab* v. *ICC, USDC*, Middle Dist. of FL: Answer to Second Amended Complaint, 45 pages, Jan. 25, 2012.
6:10-cv-01208-ACC-GJK, *Ecolab* v. *ICC, USDC*, Middle Dist. of FL: Motion to Seal Document, 23 pages, Jan. 26, 2012.
International Search Report (PCT/US2007/002954), dated Feb. 20, 2007.
European Search Report for Application No. 14779527.2 dated Jul. 29, 2016.

\* cited by examiner

CONVEYOR LUBRICANTS INCLUDING EMULSIONS AND METHODS EMPLOYING THEM

CROSS REFERENCE TO RELATED APPLICATIONS

This application is a continuation application of U.S. application Ser. No. 15/150,880, filed May 10, 2016, now U.S. Pat. No. 9,896,641, issued Feb. 20, 2018, which is a continuation of U.S. application Ser. No. 13/240,096, filed Sep. 22, 2011, now U.S. Pat. No. 9,359,579, issued Jun. 7, 2016, which claims benefit to U.S. Provisional Application Serial No. 61/386,292, filed Sep. 24, 2010, which is incorporated by reference herein in its entirety.

FIELD

The present disclosure relates to conveyor lubricant compositions including an emulsion. The present disclosure also relates to methods of employing such lubricant compositions. In an embodiment, the methods include applying the present lubricant composition to a conveyor with a non-energized nozzle. In an embodiment, the methods include applying the present lubricant composition in a "semi-dry" mode.

BACKGROUND

In commercial container filling or packaging operations, the containers typically are moved by a conveying system at very high rates of speed. Typically, lubricant compositions are applied to the conveying system to permit high-speed operation of the conveyor and limit marring of the containers or labels. Lubricants can be "wet" lubricants or "dry" lubricants.

Wet lubricants refer to a concentrated lubricant that is diluted with water to form an aqueous dilute lubricant solution (i.e., dilution ratios of 100 part of water to 1 part lubricant up to 500 parts of water to 1 part lubricant), and copious amounts of aqueous dilute lubricant solutions are applied to the conveyor or containers using spray or pumping equipment. These lubricant solutions disadvantageously require use of large amounts of water on the conveying line, which must then be disposed of or recycled, and which cause an unduly wet environment near the conveyor line. Also, variations in the water can have negative side effects on the dilute lubricant solution. For example, the presence or absence of dissolved minerals and alkalinity in the water can cause an unacceptably high coefficient of friction between lubricated surfaces and poor lubrication.

When an aqueous dilute lubricant solution is used, it is typically applied at least half of the time the conveyor is running, or applied continuously. By running the aqueous dilute lubricant solution continuously, more water and more lubricant are used, and the lubricant concentrate drums have to be switched out more often. Much of the dilute aqueous lubricant solution runs off of the conveyor surface and is wasted and furthermore drip pans are required to collect waste lubricant solution and carry it to the drain.

A limitation with aqueous dilute lubricant solutions is that when the lubricant spray ceases, COF values increase rapidly and thus conventional aqueous lubricants are applied in a continuous or nearly continuous fashion. It is believed that the COF values increase when the aqueous lubricant drains from the conveyor surface because the lubricating liquid film between surfaces in sliding contact is substantially water. The relatively rapid draining of the aqueous lubricant composition severely limits the period of non-application time.

"Dry" lubricants refer to lubricant compositions that are applied intermittently to a container or conveyor without dilution. However, this application typically required special dispensing equipment such as energized nozzles. Energized nozzles refer to nozzles where the lubricant stream is broken into a spray of fine droplets by the use of energy, which may include high pressures, compressed air, or sonication to deliver the lubricant. Silicone-based dry lubricants have been described that do not require special dispensing equipment and can be applied using non-energized nozzles. However, silicone is primarily effective at lubricating plastics such as PET bottles, and has been observed to be less effective at lubricating on glass or metal containers, particularly on a metal surface.

It is against this background that this present disclosure is made.

SUMMARY

Surprisingly, it has been found that emulsions of certain compositions are effective lubricants for glass and metal containers. The emulsions can be characterized as emulsions of high viscosity oils in which the high viscosity oil is dispersed in water or water plus a hydrophilic diluent. Preferable emulsions of high viscosity oils include compounds which are substantially water insoluble and weakly amphipathic. Weakly amphipathic compounds are characterized by having a hydrophobic group plus a hydrophilic group in which the hydrophilic group provides insufficient water solubility so as to enable the compound to form clear micellular solutions. Preferred emulsions contain amphipathic compounds in sufficient quantities so as to impart desirable lubrication properties.

Accordingly, in some aspects, the present disclosure relates to a method for lubricating the passage of a container along a conveyor where the method includes applying an emulsion of a high viscosity oil intermittently where the lubricant emulsion is applied for a period of time and not applied for a period of time and the ratio of not applied: applied time is at least 2:1.

DETAILED DESCRIPTION

The Conveyor Lubricants and Methods

The present disclosure relates to conveyor lubricant compositions including an emulsion of a high viscosity oil. Additionally, the present disclosure relates to conveyor lubricant compositions including an emulsion of a water insoluble weakly amphipathic compound. The present disclosure also relates to methods employing such lubricant compositions. In some embodiments, the method includes applying the present lubricant composition to a conveyor through a non-energized nozzle. In some embodiments, the method includes applying the present lubricant compositions to a conveyor in a "semi-dry" mode. In some embodiments a lubricant emulsion concentrate comprising a high viscosity oil is diluted with water to form a lubricant use solution that has a ratio of lubricant emulsion concentrate to water of about 1:30 to about 1:1000.

While not wishing to be bound by theory, it is believed that weakly amphipathic groups tend to increase the affinity of oils for surfaces, providing a benefit for lubrication. Formation of associative complexes in liquids between hydrophilic groups may effectively increase the viscosity of liquids containing weakly amphipathic compounds, and interactions between hydrophilic and hydrophobic moieties in liquids which contain weakly amphipathic compounds may be disrupted by shear. Accordingly, liquids comprising weakly amphipathic compounds may be characterized by relatively higher viscosity and viscosity that varies as a function of the shear rate. Liquids which exhibit different viscosities as a function of shear rate are referred to as non-Newtonian liquids.

While previously it has been described that emulsions may be applied as lubricants by intermittent application, useful examples included emulsions in which the dispersed liquid phase had relatively low viscosity, generally about 20 to 350 centipoise. In such cases, the only required function of the continuous aqueous phase is that of a vehicle to convey the suspended, dispersed oil droplets to surfaces of the conveyor and package in sliding contact. During and following long periods of non-application of the lubricant spray, evaporation of water leaves a lubricating thin film which is substantially or completely composed of the emulsified oil.

In contrast, the presently described emulsions of highly viscous oils including those which contain large proportions of weakly amphipathic compounds provide poor lubrication properties when used as "dry" lubricants including unacceptably high coefficients of friction between parts in sliding contact, unacceptably high levels of soil, excessive wear, excessive amperage draws and high energy requirements, skipping and jumping of chains, chain "tenting" which is also known as "camel backing" (incomplete articulation of adjacent chain links prevents them from lying flat), and motor overheating. Surprisingly, it has been found that these emulsions of high viscosity oils which give poor performance as dry lubricants give excellent performance when used in a semi-dry mode, that is, when the emulsion is diluted with water and applied with larger liquid volume addition rates. Larger liquid volume addition rates relative to "dry" application may be achieved by using larger flow rate nozzles or greater proportion of application time to non-application time, or both. While not wishing to be bound by theory, it is believed that water is an important component of effective lubricant thin films comprising high viscosity oils wherein water acts to reduce the viscosity of the lubricating thin film and lower the coefficient of friction between surfaces in sliding contact whether measurable (as in the case of bottle—conveyor surface and wear strip-conveyor link interfaces) or immeasurable (as in the case of articulating surfaces between conveyor links and pins). Compared to conventional wet lubricants where water acts as the solvent in a single phase dilute aqueous solution lubricant film, in the case of emulsions of high viscosity oils, it is believed that water is a constituent of a non-homogeneous two phase lubricating film in which the function of water is to reduce the viscosity of the two phase lubricating film.

The Lubricant Compositions

The present conveyor lubricant compositions include an emulsion of a high viscosity water insoluble oil. "High viscosity oils" refer to compounds or mixtures of compounds that, at the concentrations described herein, are insoluble in water at 25° C. and when mixed with water give either a second, separated liquid phase or form colloidal dispersions which exhibit a Tyndall effect, translucency or opacity. "High viscosity oil" also refers to a water insoluble liquid which has a viscosity of about 300 centipoise or greater, about 500 centipoise or greater, or about 1000 centipoise or greater when measured using a parallel plate rheometer with a 0.25 mm gap between 20 mm diameter plates at a shear rate of 5.9 $sec^{-1}$. It is understood that the "high viscosity oil" can include a high viscosity oil or a combination of a high viscosity oil and other oils together in one oil phase, where the overall viscosity of the oil phase is high, such as about 300 centipoise or greater, about 500 centipoise or greater, or about 1000 centipoise or greater.

In some embodiments, the high viscosity oil or weakly amphipathic compound can be characterized as non-Newtonian versus Newtonian. A Newtonian fluid has a linear viscosity, regardless of any shear that is placed on the fluid. In contrast, a non-Newtonian fluid does not have a linear viscosity when shear is applied to it. In preferred embodiments the lubricant emulsion comprises a non-aqueous phase that is non-Newtonian where the viscosity varies by more than a factor of 1.1 over a range of shear rate values from 3.0 $sec^{-1}$ to 18.1 $sec^{-1}$ when measured with a parallel plate rheometer.

Preferred high viscosity oils include weakly amphipathic compounds. In some embodiments, the high viscosity oil can be made up of 0%, at least 10%, at least 25%, at least 50%, or 100% weakly amphipathic compound. Weakly amphipathic compounds are characterized by having a hydrophobic group plus a hydrophilic group in which the hydrophilic group provides insufficient water solubility to enable the compound to form clear micellular solutions at the concentrations described herein. The high viscosity oil or the water insoluble weakly amphipathic compounds need to be emulsified to make them "water-miscible" or sufficiently water-soluble or water-dispersible so that when added to water or water plus a hydrophilic diluent at the desired use level they form a stable solution, emulsion or suspension. Suitable hydrophilic diluents include alcohols such as isopropyl alcohol. The desired use level will vary according to the particular conveyor or container application, and according to the type of water insoluble weakly amphipathic compound or high viscosity oil and the emulsifier employed.

The present lubricant compositions can include amounts of the water insoluble weakly amphipathic compound or high viscosity oil, emulsifier, and water or hydrophilic diluent in about the following ranges, where the weight percent of the water insoluble weakly amphipathic compounds or high viscosity oils is exclusive of any water or hydrophilic diluent that may be present as an emulsifier:

| Lubricant Concentrate Composition Ranges | | | |
|---|---|---|---|
| | Weight Percents | | |
| Water Insoluble Weakly Amphipathic Compounds/High Viscosity Oil | 1 to 20 | 1.5 to 15 | 2 to 10 |
| Emulsifier | 0 to 20 | 0 to 15 | 0 to 10 |
| Water/Hydrophilic Diluent | 60 to 99 | 70 to 98.5 | 90 to 98 |
| Additional Components | 0 to 10 | 0 to 5 | 0 to 1 |

| Lubricant Use Composition Ranges (Semi-Dry Mode) | | | |
|---|---|---|---|
| | Weight Percents | | |
| Water Insoluble Weakly Amphipathic Compounds/High Viscosity Oil | 0.01 to 0.35 | 0.02 to 0.25 | 0.05 to 0.15 |
| Emulsifier | 0 to 0.35 | 0 to 0.25 | 0 to 0.15 |
| Water/Hydrophilic Diluent | 99.3 to 99.99 | 99.5 to 99.98 | 99.7 to 99.95 |
| Additional Components | 0 to 0.2 | 0 to 0.1 | 0 to 0.02 |

High Viscosity Oils and Water Insoluble Weakly Amphipathic Compounds

The lubricant compositions of the present disclosure include a water insoluble high viscosity oil which preferably comprises a weakly amphipathic compound. In some embodiments, the water insoluble weakly amphipathic compound or high viscosity oil is an un-acidified fatty amine, a water insoluble phosphate ester, or alcohol ethoxylate carboxylates.

Preferred weakly amphipathic compounds include:

Amine or amine derivatives such as oleyl diamino propane, coco diamino propane, lauryl propyl diamine, dimethyl lauryl amine, PEG coco amine, alkyl $C_{12}$-$C_{14}$ oxy propyl diamine, and the amine compositions described in U.S. Pat. Nos. 5,182,035 and 5,932,526, both of which are incorporated by reference herein in their entirety.

Phosphate esters of the general formula:

$$R^1(EO)_xOPO_3H_2 \text{ and } R^2(EO)_yR^3(EO)_zOPO_2H$$

in which $R^1$, $R^2$, and $R^3$ are independently linear or branched, saturated and/or unsaturated, optionally hydroxy- and/or epoxy-substituted residues with 6 to 22, e.g., 12 to 18 carbon atoms. Exemplary phosphate esters include oleyl-$(EO)_4OPO_3H_2$ and oleocetyl-$(EO)_5OPO_3H_2$.

Water insoluble alkyl ethercarboxylates of the general formula:

$$R^4(EO)_xOCH_2COOH$$

in which $R^4$ is a linear or branched, saturated and/or unsaturated, optionally hydroxy- and/or epoxy-substituted residues with 6 to 22, e.g., 12 to 18 carbon atoms. Exemplary alkyl ethercarboxylates include oleocetyl-$(EO)_2CH_2COOH$ and oleocetyl-$(EO)_5CH_2COOH$.

Partial glycerides such as monoglycerides, diglycerides and blends thereof of the general formula:

$$\begin{array}{c} CH_2OR^6 \\ | \\ CHOR^7 \\ | \\ CH_2OR^8 \end{array}$$

in which $R^6$, $R^7$ and $R^8$ independently represent a linear or branched, saturated and/or unsaturated ester residue with 6 to 22, for example, 12 to 18 carbon atoms or H with the proviso that at least one of the two residues $R^7$ and $R^8$ is H. Exemplary monoglycerides, diglycerides, or triglycerides include esters of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselinic acid, linoleic acid, linolenic acid, eleostearic acid, arachic acid, gadoleic acid, behenic acid, erucic acid, or mixtures thereof. Suitable glycerides include lauric acid glycerides, palmitic acid glycerides, stearic acid glycerides, isostearic acid glycerides, oleic acid glycerides, behenic acid glycerides, erucic acid glycerides, or mixtures thereof and include those displaying a monoglyceride content in the from about 50 to about 95 wt-%, for example, about 60 to about 90 wt-%. Partial esters of glycerine with linear or branched long chain (greater than about 8 carbon atoms) fatty acids include glycerol monooleate, glycerol monoricinoleate, glycerol monostearate, and glycerol monotallate (e.g. Lumulse GMO-K, Lumulse GMR-K, Lumulse GMS-K, and Lumulse GMT-K, available from Lambent Technologies, Gurnee Ill. and Tegin OV, available from Goldschmidt Chemical Corporation, Hopewell, Va.), or a mixture thereof. Suitable partial glycerides also include those sold under the tradenames Cutina EGMS, Cutina GMS-SE, Cutina GMS V, Cutina MD, or Cutina AGS, which are commercially available from Cognis.

Phospholipids such as phosphatidic acids, real lecithins, cardiolipins, lysophospholipids, lysolecithins, plasmalogens, phosphosphingolipids, sphingomyelins. Suitable phospholipids include phosphatidylcholine, phosphatidylethanolamine, phosphatidylinositol, or N-acylphosphatidylethanolamine, or mixture thereof. Suitable phospholipids also include lecithins such as crude lecithins which have been deoiled, fractionated, spray-dried, acetylated, hydrolyzed, hydroxylated, or hydrogenated and soybean lecithins. As used herein, the general term "lecithin" includes phospholipids.

Phosphatidic acids are glycerol derivatives which have been esterified in the 1-sn- and 2-position with fatty acids (1-sn-position: mostly saturated, 2-position: mostly mono- or polyunsaturated), but on atom 3-sn with phosphoric acid. The phosphate radical can be esterified with an amino alcohol, such as choline (lecithin=3-sn-phophatidylcholine), 2-aminoethanol (ethanolamine), L-serine (cephalin=3-sn-phosphatidylethanolamine or sn-phosphatidyl-L-serine), with myoinositol to give the phosphoinositides [1-(3-sn-phosphatidyl)-D-myoinositols], with glycerol to give phosphatidyl glycerols.

Cardiolipins (1,3-bisphosphatidyl glycerols) are phospholipids of two phosphatidic acids linked via glycerol. Lysophospholipids are obtained when an acyl radical is cleaved off by a phospholipase A from phospholipids (e.g. lysolecithins). The phospholipids also include plasmalogens in which an aldehyde (in the form of an enol ether) is bonded in the 1-position instead of a fatty acid. Phosphosphingolipids are based on the basic structure of sphingosine or else phytosphingosine.

Phospholides such as those sold under the trade names Lipoid S 20 S, Lipoid S 75, Lipoid S 100, Lipoid S 100-3, Lipoid S 75-3N, Lipoid SL 80, and Lipoid SL 80-3, which are commercially available from Lipoid; Phospholipon 85 G, Phospholipon 80, Phospholipon 80 H, Phospholipon 90 G, Phospholipon 90 H, Phospholipon 90 NG, Phospholipon 100 H, Phosal 35B, Phosal 50G, Phosal 50SA, Phosal 53MCT, and Phosal 75SA, which are commercially available from Phospholipon, Cologne Germany; Alcolec Z-3 available from American Lecthin Company, Oxford Conn.; Emulfluid F30, Emulfluid, Lipotin NE, Lipotin 100, Lipotin SB, Lipotin 100J, Lipotin H, Lipotin NA, Lipotin AH, and Lipopur, which are commercially available from Cargill (Degussa Texturant Systems); Terradrill V 408 and Terradrill V 1075, which are commercially available from Cognis; Yellowthin 100, Yellowthin 200, Lecistar Sun 100, and Yellowthin Sun 200, which are commercially available from Sternchemie; and Lanchem PE-130K available from Lambent Technologies, Gurnee, Ill.

Lanolins and lanolin derivatives including hydrogentated lanolin and lanolin alcohol (e.g Technical Grade Lanolin, Ritawax, and Supersat available from Rita Corporation, Crystal Lake Ill.).

Long chain (greater than about 8 carbon atoms) fatty acid compounds including a fatty acid derived from the saponification of vegetable or animal fat or an oil such as tall oil fatty acid, coconut fatty acid, oleic acid, ricinoleic acid, or carboxylic acid terminated short chain polymers of hydroxyl functional fatty acids such as ricinoleic acid and salts thereof (e.g. Hostagliss L4 available from Clariant Corporation, Mount Holly N.J.), or a mixture of these compounds. Fatty acid lipophilic compounds include caproic acid, lauric acid, myristic acid, oleic acid, stearic acid (e.g. C-698, C-1299, C-1495, OL-800 and V-1890, available from Proctor and Gamble Chemicals, Cincinnati Ohio), or a mixture thereof.

Water insoluble alcohol ethoxylates, alcohol propoxylates, and alcohol ethoxylate propoxylates formed from the addition of ethylene oxide and/or propylene oxide to linear or branched long chain (C8 or greater) fatty alcohols. Exemplary alcohol ethoxylates include oleocetyl-(EO)$_2$H and dodecyl-(EO)H.

Sorbitan esters with linear or branched long chain (greater than about 8 carbon atoms) fatty acids such as sorbitan monolaurate, sorbitan monopalmitate, sorbitan monostearate, and sorbitan monooleate (e.g., SPAN series 20, 40, 60, and 80, available from Uniqema, New Castle, Del. and Lumisorb SMO, available from Lambent Technologies, Gurnee Ill.), or a mixture of these surfactants.

Mono- and di- esters of glycerine with linear or branched long chain (greater than about 8 carbon atoms) fatty acids further esterified with short chain monocarboxylic acids, such as glycerol monostearate lactate (e.g. Grindsted Lactem P22, available from Danisco, Copenhagen Denmark), or a mixture of these surfactants.

Long chain (greater than about 8 carbon atoms) fatty alcohol compounds including capryl alcohol, 2-ethyl hexanol, capric alcohol, lauryl alcohol, isotridecyl alcohol, myristyl alcohol, cetyl alcohol, oleyl alcohol, behenyl alcohol, and erucyl alcohol.

In some embodiments, the water insoluble weakly amphipathic compounds or high viscosity oils are an un-acidified fatty amine and unneutralized water insoluble phosphate ester. In some embodiments, the water insoluble weakly amphipathic compounds or high viscosity oils are un-acidified fatty amines at a pH from about 8 to about 14.

High viscosity oils may also include other water insoluble oils that are not characterized as weakly amphipathic compounds. Other water insoluble oils useful in the practice of this disclosure include the following:

Triglycerides of the general formula:

in which R$^3$, R$^4$, and R$^5$ are independently linear or branched, saturated and/or unsaturated, optionally hydroxy- and/or epoxy-substituted ester residues with 6 to 22, e.g., 12 to 18 carbon atoms. Exemplary triglycerides include those sold under the trade names Myritol 331, Myritol 312, Myritol 318, Terradrill V988, the Terradrill EM, which are commercially available from Cognis; Miglyol 812 N and Miglyol 812, which are commercially available from Sasol, and Lumulse CC33K which is commercially available from Lambent. Triglycerides can include naturally occurring oils from vegetable and animal sources such as coconut oil, sunflower seed oil, canola oil, and lard.

Diesters of glycol or poly(alkylene glycol) compounds with linear or branched long chain (greater than about 8 carbon atoms) fatty acids including neopentyl glycol dicaprylate/dicaprate and PEG-4 diheptanoate (e.g. Liponate NPCG-2 and Liponate 2-DH, available from Lipo Chemicals, Paterson N.J.).

Partial and higher sorbitan esters, include for example, di- or tri- esters with linear or branched long chain (greater than about 8 carbon atoms) fatty acids, such as sorbitan tristearate, sorbitan trioleate, and sorbitan sesquioleate (e.g., Lumisorb STS K, available from Lambent Technologies, Gurnee Ill., and Liposorb TO and Liposorb SQO, available from Lipo Chemicals, Paterson N.J.), or a mixture of these compounds.

Fatty acid esters of polyols include polyol fatty acid polyesters, which term refers to a polyol that has two or more of its hydroxyl groups esterified with linear or branched long chain (greater than about 8 carbon atoms) fatty acid groups. For example, the polyol can be esterified with four or more fatty acid groups. Polyol fatty acid polyesters include sucrose polyesters having on average at least four, e.g., at least about five, ester linkages per molecule of sucrose; the fatty acid chains can have from about eight to about twenty-four carbon atoms. Other polyol fatty acid polyesters are fatty acid esters of aliphatic or aromatic compounds containing at least two free hydroxyl groups including saturated and unsaturated straight and branch chain linear aliphatics; saturated and unsaturated cyclic aliphatics, including heterocyclic aliphatics; or mononuclear or polynuclear aromatics, including heterocyclic aromatics. Fatty acid esters of sucrose include the soyate fatty acid ester of sucrose and the stearate fatty acid ester of sucrose (e.g. Sefose 1618S and Sefose 1618H, available from Proctor and Gamble Chemicals, Cincinnati Ohio). Fatty acid esters of pentaerythritol and dipentaerythritol include pentaerythrityl tetracaprylate/tetracaprate and dipentaerythrityl hexacaprylate/hexacaprate (e.g. Liponate PE-810 and Liponate DPC-6 available from Lipo Chemicals, Paterson N.J.).

Methyl, ethyl, and isopropyl esters of fatty acids including methyl palmitate and methyl stearate (e.g. CE-1695 and CE-1897, available from Proctor and Gamble Chemicals, Cincinnati Ohio).

Esters made from esterification of alcohols with 6 to 22 carbon atoms alcohols with fatty acids such as cetyl palmitate, palmoyl palmitate, cetyl stearate, cetyl isostearate, cetyl oleate, 2-ethyl hexyl palmitate, and stearyl stearate.

Fatty alcohol esters of benzoic acid including C12-C15 alkyl benzoate (e.g. Liponate NEB, available from Lipo Chemicals, Paterson N.J.).

Fatty alcohol esters of phthalic acid or isophthalic acid including dioctyl phthalate.

Fatty alcohol esters of trimellitic acid including tridecyl trimellitate (e.g. Liponate TDTM, available from Lipo Chemicals, Paterson N.J.).

Fatty acid esters of trimethylol propane include trimethylol propane trioleate and trimethylol propane tricaprate/caprylate (e.g. Synative ES 2964 available from Cognis and Priolube 3970 available from Uniqema New Castle, Del.).

Mineral oil.

Emulsifier

Useful emulsifiers for preparing lubricant compositions with high viscosity oils include surfactants that are water soluble, that is, capable to give clear micellular solutions above about 1% concentration. Suitable surfactants include:

polyglyceryl monoesters with linear or branched long chain (greater than about 8 carbon atoms) fatty acids such as triglycerol monooleate (e.g. Lumulse PGO-K, available from Lambent Technologies, Gurnee Ill.), or a mixture of these surfactants;

ethoxylated mono- and di- esters of glycerine with linear or branched long chain (greater than about 8 carbon atoms) fatty acids such as poly(oxyethylene) glyceryl monolaurate (e.g. Lumulse POE(7) GML and Lumulse POE(20) GMS-K, available from Lambent Technologies, Gurnee Ill.), or a mixture of these surfactants;

ethoxylated sorbitan esters with linear or branched long chain (greater than about 8 carbon atoms) fatty acids such as polyoxyethylene (20) sorbitan monolaurate (polysorbate 20), polyoxyethylene (20) sorbitan monopalmitate (polysorbate 40), polyoxyethylene (20) sorbitan monostearate (polysorbate 60), and polyoxyethylene (20) sorbitan monooleate (polysorbate 80) (e.g., TWEEN series 20, 40, 60, and 80, available from Uniqema, New Castle, Del.), or a mixture of these surfactants;

ethoxylated castor oils such as PEG-5 castor oil, PEG-25 castor oil, and PEG-40 castor oil (e.g. Lumulse CO-5, Lumulse CO-25, and Lumulse CO-40 available from Lambent Technologies, Gurnee Ill.), or a mixture of these surfactants;

mono- and di- esters of ethylene glycol and poly(ethylene glycol) with linear or branched long chain (greater than about 8 carbon atoms) fatty acids such as ethylene glycol distearate, PEG-400 monooleate, PEG-400 monolaurate, PEG-400 dilaurate, and PEG-4 diheptanoate (e.g. Lipo EGDS available from Lipo Chemicals, Paterson N.J., Lumulse 40-OK, Lumulse 40-L, and Lumulse 42-L available from Lambent Technologies, Gurnee Ill. and LIPONATE 2-DH, product of Lipo Chemicals, Inc., Paterson N.J.), or a mixture of these surfactants;

EO-PO block copolymers such as poly(ethylene oxide)-poly(propylene oxide)-poly(ethylene oxide) block copolymers and poly(propylene oxide)-poly(ethylene oxide)-poly(propylene oxide) block copolymers (e.g. Pluronic and Pluronic R series products available from BASF Corporation, Florham Park N.J.), or a mixture of these surfactants;

water soluble alcohol ethoxylates, alcohol propoxylates, and alcohol ethoxylate propoxylates formed from the addition of ethylene oxide and/or propylene oxide to linear or branched long chain (C8 or greater) fatty alcohols such as poly(ethylene oxide) undecyl ether, poly(ethylene oxide) ether with (C12-C15) linear primary alcohols, poly(ethylene oxide) ether with (C14-C15) linear primary alcohols, and ethoxylated propoxylated C8-10 alcohols (e.g. Tomadol 25-7 alcohol ethoxylate and Tomadol 45-7 alcohol ethoxylate available from Air Products, Inc., Allentown Pa.; and Antarox BL-214 available from Rhodia, Cranbury N.J.), or a mixture of these surfactants;

alcohol ethoxylates formed from the addition of ethylene oxide to linear and branched alkylphenol compounds such as poly(ethylene oxide) ether with nonyl phenol (e.g. Marlipal O13/100 available from Sasol, Lutensol TDA 9 available from BASF, Surfonic N95, available from Huntsman Chemical Corporation, The Woodlands, Tex.), or a mixture of these surfactants;

alkylated mono-, di- and oligoglycosides containing 8 to 22 carbon atoms in the alkyl group and ethoxylated alkylated mono-, di- and oligoglycosides containing 8 to 22 carbon atoms in the alkyl group such as poly(D-glucopyranose) ether with (C8-C14) linear primary alcohols (e.g. Glucopon 425N/HH, available from Cognis North America, Cincinnati Ohio), or a mixture of these surfactants;

amide compounds formed from linear or branched long chain (greater than about 8 carbon atoms) fatty acids such as coconut acid diethanolamide and oleic acid diethanolamide (e.g. Ninol 40-CO and Ninol 201, available from Stepan Corporation, Northfield Ill. and Hostacor DT, available from Clariant Corporation, Mount Holly, N.C.), or a mixture of these surfactants;

ethoxylate compounds formed from the addition of ethylene oxide to amide compounds formed from linear or branched long chain (greater than about 8 carbon atoms) fatty acids such as poly(ethylene oxide) ether with coconut acid ethanolamide (e.g. Ninol C-5 available from Stepan Corporation, Northfield Ill.), or a mixture of these surfactants;

nonionic silicone surfactants such as poly(ethylene oxide) ether with methyl bis(trimethylsilyloxy) silyl propanol (e.g. Silwet L77 available from Momentive Performance Materials, Wilton N.J.), or a mixture of these surfactants;

ether carboxylic acids with linear or branched chain with greater than 6 carbon atoms and sufficient ethylene oxide residues so as to be water soluble (e.g. Akypo LF 6 available from KAO Chemicals, Akypo RO 90 available from KAO Chemicals, Emulsogen COL 100 available from Clariant);

water soluble phosphate esters of the general formula:

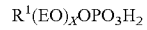

$R^1(EO)_xOPO_3H_2$ in which $R^1$ is a linear or branched alkyl group with 6 to 22, e.g., 12 to 18 carbon atoms or an alkylphenol group. Exemplary phosphate esters include $C_8$-$C_{10}$-$(EO)_6OPO_3H$ such as Rhodafac RA-600, available from Rhodia, Cranbury N.J.);

water soluble long chain (greater than about 8 carbon atoms) alkyl sulfonate and sulfate compounds such as octanesulfonic acid, sulfuric acid ester with lauryl alcohol, sulfuric acid ester with lauryl alcohol and salts thereof (e.g. Texapon K-12G and Texapon K-14S available from Cognis North America, Cincinnati Ohio), or a mixture of these surfactants;

water soluble sulfonated succinic acid esters with ethoxylated long chain (greater than about 8 carbon atoms) alcohols such as Texapon SB 3KC available from Cognis North America, Cincinnati Ohio), or a mixture of these surfactants;

water soluble sulfuric acid esters of linear or branched long chain (greater than about 8 carbon atoms) alcohol ethoxylates, alcohol propoxylates, alcohol ethoxylate propoxylates and ethoxylated linear and branched alkylphenol compounds and salts thereof such as sodium dodecylpoly(oxyethylene) sulfate (e.g., Texapon N70 available from Cognis North America, Cincinnati Ohio), or a mixture of these surfactants;

water soluble sulfonates of benzene, cumene, toluene and alkyl substituted aromatic compounds and salts thereof such as sodium alkyl benzene sulfonic acid (e.g. Nansa HS90/S, available from Huntsman Chemical Corporation, The Woodlands, Tex.), or a mixture of these surfactants; or a mixture of such surfactants.

Preferred emulsifiers include Akypo RO 90, Emulsogen COL 100, and Emulsogen CNO 080.

More About Emulsions and Emulsifiers

When dispersing oils or hydrophobic materials, the present formulators have found that emulsification systems made up of two or more emulsifiers tend to give better dispersion properties, for example more stable dispersions, than a single emulsifier. When formulating emulsions with two or more emulsifiers, emulsifiers with different HLB values can be used and the ratio of emulsifiers adjusted to achieve a composite HLB value that is most suitable for emulsifying the hydrophobic material. In the case that two or more emulsifiers with different HLB values are used, it may be the case that emulsifiers with low HLB values are insoluble in water and themselves meet the definition of weakly amphipathic compounds as described above. Therefore some compounds included in a list of weakly amphiphatic compounds useful in the present disclosure will also be included in a list of emulsifiers useful in the present disclosure.

Although the terms colloid and emulsion are sometimes used interchangeably, emulsion tends to imply that both the dispersed and the continuous phase are liquid. A commonly referred to example of an emulsion is milk, in which most of the milk lipid is in the form of globules ranging in size from 0.1 to 15 um in diameter. In the context of the present disclosure, by emulsion it is meant a colloidal system in which the dispersed phase is a liquid, a semi-solid, or a low melting solid with a melting point less than about 100° C. and wherein the lipophilic compound is dispersed in and remains separate from a liquid continuous phase which may be water, an aqueous solution, or another polar liquid in which the lipophilic compound is insoluble, and wherein the particle size of the dispersed phase ranges between about 10 angstroms and 15 microns. Emulsions of the present disclosure are characterized by one or more of the following: is opaque or translucent, exhibits a Tyndall effect, and/or contains dispersed material that will not pass through a membrane.

An emulsifier stabilizes an emulsion. Typically emulsifiers are amphipathic surface active compounds which possess both hydrophilic and hydrophobic moieties. The ratio of hydrophilic and hydrophobic moieties in a surfactant is commonly expressed as the hydrophilic-lipophilic balance or HLB. In the preparation of emulsions, it may be desirable to use more than one emulsifying compound in which case the emulsifier present in the greatest concentration may be referred to as the primary emulsifier and emulsifiers present in lower concentrations may be referred to as co-emulsifiers or secondary emulsifiers, or all of the emulsifiers present in a composition may be referred to as co-emulsifiers.

Emulsions are unstable and thus do not form spontaneously. There are two prevalent methods for formation of colloidal dispersions including emulsions which are generation of the dispersed phase in situ and introduction of the dispersed phase into the continuous phase with energy in processes including heating, shaking, stirring, high shear mixing, and microfluidization. Emulsions of the present disclosure can be prepared by introduction of the dispersed phase into the continuous phase.

Over time, emulsions tend to revert to the stable state of oil separated from water, a process which is slowed by emulsifiers. It is understood that in the context of the present disclosure that "stable emulsion" does not refer only to systems that are thermodynamically stable, but also includes systems in which the kinetics of decomposition have been greatly slowed, that is, metastable systems. Emulsions can decompose through processes of flocculation (aggregation of dispersed particles), creaming (migration of the dispersed particles to the top of the emulsion due to buoyancy), and coalescence (combination of dispersed droplets to form larger ones).

In certain embodiments, a stable emulsion according to the present disclosure does not physically phase separate, exhibit creaming or coalescence, or form precipitate. In an embodiment, the emulsion is sufficiently stable that it is stable under conditions at which a conveyor lubricant composition is stored and shipped. For example, in an embodiment, the present stable emulsion does not phase separate in one month at 4 to 50° C., or even in two months or three months at such temperatures.

Dialysis presents a simple test for insolubility of a lipophilic compound. A lipophilic compound can be considered insoluble if when dialyzed through a membrane with a molecular weight cut off of 1,000, the lipophilic compound is retained in the interior of the dialysis tubing.

Because the densities of high viscosity water insoluble oils and weakly amphipathic compounds are often greatly different than that of water, stabilization of fluid emulsions is favored by small particle sizes. Small particle size oil in water emulsions can be provided by the use of high shear processes, by the use of co-solvents, or they may be provided by certain compositions and concentrations of high viscosity oils with emulsifiers/and or anionic surfactants and water, or both co-solvents and high shear processes. For example, in the absence of high shear processing, addition of a mixture of high viscosity oil plus emulsifiers to stirring water plus hexylene glycol solution may give a stable emulsion with a small particle size whereas addition of the same mixture of oil and emulsifiers to water alone will not. Emulsions of the present disclosure can have volume average particle sizes less than about 10 microns, e.g., less than about 3 microns, or less than about 1 micron. For ease of application by spraying, an emulsion of the present composition can have a viscosity of about 40 cP or less.

Additional Components

The lubricant compositions can contain additional components if desired. For example, the compositions can contain adjuvants such as antimicrobial agents, colorants, foam inhibitors or foam generators, cracking inhibitors (e.g., PET stress cracking inhibitors), viscosity modifiers, film forming materials, surfactants, antioxidants, antistatic agents, corrosion inhibitors and mixtures thereof. The amounts and types of such additional components will be apparent to those skilled in the art.

The lubricant composition can be a liquid or semi-solid at the time of application. In some embodiments, the lubricant composition is a liquid having a viscosity that will permit it to be pumped and readily applied to a conveyor or containers, and that will facilitate rapid film formation whether or not the conveyor is in motion. The lubricant composition can be formulated so that it exhibits shear thinning or other pseudo-plastic behavior, manifested by a higher viscosity (e.g., non-dripping behavior) when at rest, and a much lower viscosity when subjected to shear stresses such as those provided by pumping, spraying or brushing the lubricant composition. This behavior can be brought about by, for example, including appropriate types and amounts of thixotropic fillers (e.g., treated or untreated fumed silicas) or other rheology modifiers in the lubricant composition.

Methods of Using the Present Lubricants

The present disclosure provides in one aspect, a method for lubricating the passage of a container along a conveyor including applying the lubricant compositions to at least a portion of the container contacting surface of the conveyor or to at least a portion of the conveyor contacting surface of the container. In some embodiments, the present disclosure is directed to a method of applying a lubricant composition in a "semi-dry" mode. The composition can be applied while the conveyor is at rest or while it is moving, e.g., at the conveyor's normal operating speed.

The lubricant composition can be applied in a constant or intermittent fashion. The lubricant composition can be applied in an intermittent fashion in order to minimize the amount of applied lubricant composition. It has been discovered that the present composition may be applied in a "semi-dry" mode. A "semi-dry" mode means that the lubricant has sufficiently low concentration of active lubricant that it is applied intermittently with greater application volume than a "dry" lubricant. For "semi-dry" application, the lubricant is applied for a period of time and not applied for a period of time and the ratio of not applied: applied time is between about 2:1 and 32:1 whereas for a "dry" lubricant the ratio of not applied: applied time is typically greater than about 50:1. It has been found that emulsions of high viscosity oils create unacceptably high coefficients of friction when run in a traditional "dry" mode, for example with ratios of not applied: applied time is typically greater than about 50:1 as described in U.S. Pat. No. 7,741,257 (Valencia Sil et al) and US Patent Application No. 20080176778 (Seemeyer et al). In addition to creating high COF values between packages and track and between parts in sliding contact, "dry" application of emulsions of high viscosity oils also tends to create excessive soiling on the track and this soiling ends up on the bottles that are ultimately shipped to consumers. Dirty bottles create the perception of a lower quality product with consumers. On the other hand, when the water insoluble weakly amphipathic compounds or high viscosity oils are run in a "wet" mode, they require copious amounts of water which drains from the conveying line and must then be disposed of or recycled, and which causes an unduly wet environment near the conveyor line.

When run in a semi-dry mode, the lubricant composition may be applied for a period of time of about 5 seconds to about 6 minutes, about 10 seconds to about 4 minutes, and about 15 seconds to about 2 minute. Thereafter, the lubricant compositions do not need to be applied for about 30 seconds to about 25 minutes, about 1 to about 15 minutes, or about 2 to about 12 minutes. The application period may be long enough to spread the composition over the conveyor belt (i.e. one revolution of the conveyor belt). During the application period, the actual application may be continuous, i.e. lubricant is applied to the entire conveyor, or intermittent, i.e. lubricant is applied in bands and the containers spread the lubricant around. The lubricant can be applied to the conveyor surface at a location that is not populated by packages or containers. For example, the lubricant spray can be applied upstream of the package or container flow or on the inverted conveyor surface moving underneath and upstream of the container or package.

In some embodiments, the ratio of non-application time to application time may be from about 2:1 to about 32:1, from about 3:1 to about 28:1, from about 4:1 to about 24:1, and from about 10:1 to about 20:1, where the lubricant maintains a low coefficient of friction in between lubricant applications.

In some embodiments, the lubricant maintains a coefficient of friction below about 0.4, below about 0.2, below about 0.15, or below about 0.12, even when the lubricant is not being applied. The lubricant coating thickness can be maintained generally at the container/conveyor interface at greater than or equal to about 0.0001 mm, e.g., about 0.001 to about 2 mm, and such as about 0.005 to about 0.5 mm, even when the lubricant is not being applied.

In some embodiments, a feedback loop may be used to determine when the coefficient of friction reaches an unacceptably high level. The feedback loop may trigger the lubricant composition to turn on for a period of time and then optionally turn the lubricant composition off when the coefficient of friction returns to an acceptable level.

In some embodiments, the lubricant compositions and methods of using the lubricant compositions do not create an unacceptably high level of soiling on the conveyor. Unacceptably soiled can be characterized in a number of way. For example, in some embodiments, unacceptably soiled refers to a level of soil such that when the package that has been conveyed is placed on a white surface such as cloth or paper, an unacceptably visible mark is left. In some embodiments, unacceptably soiled refers to the conveyor surface having an unacceptably soiled visual appearance. In some embodiments, unacceptably soiled refers to a quantified level of soiling. For example, in the case of production lines which include stainless steel conveyors, the extent of soiling may be measured in terms of weight of iron present as soil per container or per conveyor belt chain link. For example the iron containing soil may be analyzed by wiping the package or the chain link with a paper tissue and then quantifying iron present by digestion and spectroscopy such as inductively coupled plasma spectroscopy. Acceptable levels of soil for bottles may be less than 100 µg iron/bottle, less than 50 µg iron/bottle, or less than 25 µg iron/bottle. Acceptable levels of soil for conveyor belt chain links may be less than 800 µg iron/square inch of link surface, less than 400 µg iron/square inch of link surface, or less than 100 µg iron/square inch of link surface. The amount of soil can also be measured by counting the number of non-white pixels according to the Short Track Conveyor Test described below. The number of non-white pixels may be less than 20%, less than 10%, or less than 5%.

Application of the lubricant composition can be carried out using any suitable technique including spraying, wiping, brushing, drip coating, roll coating, and other methods for application of a thin film.

A variety of kinds of conveyors and conveyor parts can be coated with the lubricant composition. Parts of the conveyor that support or guide or move the containers and can be coated with the lubricant composition include belts, chains, gates, chutes, sensors, and ramps having surfaces made of fabrics, metals, plastics, composites, or combinations of these materials. The lubricant can reside or be deliberately applied so as to reside between the conveyor belt chain and conveyor belt chain support such as a wear strip. For example, a nozzle may be placed underneath the conveyor belt table top with a spray directed at the underside of the conveyor belt chain link, or a nozzle may be placed with a spray directed towards the wear strip at a location where it is accessible through or underneath the conveyor belt chain.

The lubricant composition can also be applied to a wide variety of containers including beverage containers; food containers; household or commercial cleaning product containers; and containers for oils, antifreeze or other industrial fluids. The containers can be made of a wide variety of materials including glasses; plastics (e.g., polyolefins such as polyethylene and polypropylene; polystyrenes; polyesters such as PET and polyethylene naphthalate (PEN); polyamides, polycarbonates; and mixtures or copolymers thereof); metals (e.g., aluminum, tin or steel); papers (e.g., untreated, treated, waxed or other coated papers); ceramics; and laminates or composites of two or more of these materials (e.g., laminates of PET, PEN or mixtures thereof with another plastic material). The containers can have a variety of sizes and forms, including cartons (e.g., waxed cartons or TETRAPACK™ boxes), cans, bottles and the like. Although any desired portion of the container can be coated with the lubricant composition, the lubricant composition can be applied only to parts of the container that will come into contact with the conveyor or with other containers. For some such applications, the lubricant composition is applied to the conveyor rather than to the container, which can limit the extent to which the container might later become slippery in actual use.

Dispensing Equipment

Dispensing equipment for practice of the present disclosure includes spraying apparatus that comprises spray nozzles that are optionally non-energized, i.e. they provide a fine lubricant spray at relatively low flow rates (less than about 10 mL/sec at pressures less than about 50 psi) without requiring applied energy (for example high pressure, compressed air, or sonication) to break up the lubricant flow into small droplets. The spray dispensing system operates at relatively lower pressure (less than about 50 psi) and does not comprise either a high pressure lubricant line or a lubricant venting line. Useful droplet sizes for the lubricant spray are from about 100 to about 5000 microns, e.g., about 100 to about 500 microns.

Exemplary nonenergized nozzles are small capacity spray nozzles which distribute the liquid lubricant as a solid (full) cone, hollow cone, flat fan or sheet-type of spray at pressures less than about 50 psi. In an embodiment, the nozzles are flat spray nozzles with tapering edges which are useful in establishing uniform spray distribution from overlapping spray patterns between adjacent sprays on a multiple nozzle header. Flat spray nozzles useful in the practice of the current disclosure include elliptical orifice nozzles and deflector nozzles. In the elliptical orifice design, the axis of the spray pattern is a continuation of the axis of the inlet pipe connection. In the deflector design, the deflection surface diverts the spray pattern away from the axis of the inlet pipe connection. Useful flat spray nozzles include FloodJet and VeeJet Small Capacity Wide Spray Angle nozzles (available from Spraying Systems, Wheaton, Ill.), FF Extra Wide Angle and NF Standard Fan nozzles (available from Bete Fog Nozzle, Inc., Greenfield, Mass.), and Flat Spray Standard nozzles (available from Allspray, Inc., Carol Stream, Ill.). A suitable deflector flat spray nozzle is the Low Flow FloodJet 1/8K-SS.25 nozzle available from Spraying Systems, Wheaton Ill. Useful cone spray nozzles include UniJet Small Capacity Standard Spray nozzles (available from Spraying Systems, Wheaton, Ill.), WT Right Angle Hollow Cone nozzles (available from Bete Fog Nozzle, Inc., Greenfield, Mass.), and Hollow Cone Standard nozzles (available from Allspray, Inc., Carol Stream, Ill.). A suitable cone spray nozzle is the UniJetTXVS-1 nozzle available from Spraying Systems, Wheaton Ill.

The dispensing apparatus for practice of the present disclosure includes a way to provide lubricant compositions to nozzles under low to moderate pressures, less than about 50 psi. One possible way of doing this is to pressurize the lubricant source. Suitable dispensing equipment also includes a way to pressurize the lubricant composition in line by pumping. The requirements for a pump are modest and can be met by a variety of pump designs including diaphragm pumps, peristaltic pumps, and valveless rotating reciprocating piston metering pumps. Suitable pumps start and stop automatically when a discharge valve downstream of the pump is opened and closed. In this way, the pump is not operating during non-application periods. Examples of pumps that start and stop automatically include positive displacement diaphragm pumps with built-in pressure switches that automatically start and stop pumping instantaneously when discharge valve is opened, for example a Flowjet 2100 pump available from Flowjet, a division of IIT Industries, Foothill Ranch, Calif. Other examples of pumps that start and stop automatically are positive displacement reciprocating double diaphragm pumps such as the Wilden PI plastic pump available from Wilden Pump & Engineering, LLC, Grand Terrace, Calif. and pneumatic single diaphragm pumps such as the Yamada NDP-5 pump available from Yamada America, West Chicago Ill. Pumps which do not automatically start and stop upon action of a downstream discharge valve may advantageously be used with a controller that actuates both the downstream discharge valve and the pump.

Methods of Making the Present Composition

High shear processes useful in the preparation of stable, small particle size emulsions include rotor-stator homogenizers, blade type homogenizers (blenders), and high pressure homogenizers (also known as microfluidizers or dairy homogenizers). In high pressure homogenizers, liquid is forced under high pressure through a narrow orifice which generates high shear. Variations of high pressure homogenization include impingement microfluidization in which two streams of liquid collide after being forced through opposing orifices, and impact ring microfluidization in which the stream of liquid impacts a flat surface surrounded by a ring.

The present disclosure may be better understood with reference to the following examples. These examples are intended to be representative of specific embodiments of the disclosure, and are not intended as limiting the scope of the disclosure.

EXAMPLES

Aqueous emulsions of the present disclosure can, if desired, be evaluated using a Viscosity Test, a Short Track Conveyor Test, and a Particle Size Test.

Short Track Conveyor Test

Conveyor systems employing motor-driven 6½ inch wide stainless steel belts were operated at belt speeds of about 170 feet/minute. The length of the conveyor system was ten feet with austenitic and ferritic alloy stainless steel conveyor belts approximately 22 feet in length. The belts included a single austenitic stainless steel track of 6½ inch wide straight running chain (SS815K750 chain available from Rexnord International, Milwaukee, Wis.), and a single ferritic stainless steel track of 6½ inch wide straight running chain (60S72M chain available from Rexnord International). Before testing lubrication properties of sample formulations, the conveyor system was scrubbed using nylon brushes and ScotchBrite® pads using a cleaning solution consisting of 2.5% sodium metasilicate, 1.0% sodium hydroxide, 1.0% Tomadol 1-3, and 0.5% Tomadol 25-7 (Tomadol products available from Air Products, Allentown Pa.). On each of the austenitic and ferritic tracks, two 12-once bottles of Miller Genuine Draft Light beer were lassoed and connected to a stationary strain gauge. The force exerted on the strain gauge during belt operation was recorded continuously every 60 seconds during operation using a computer. On each of the austenitic and ferritic tracks and downstream of the bottles connected to the strain gauge, twenty-four additional 12-ounce bottles were held stationary on the moving tracks. Lubricant compositions were applied to the surface of the belt using conventional lubricant spray nozzles operating at 36 psi to 44 psi and delivering lubricant at 60 ml/minute to 80 ml/minute. The coefficient of friction (COF) was calculated by dividing the drag force (F) by the weight of the two 12-ounce filled glass bottles plus the lasso (W): COF=F/W. The coefficient of friction between conveyor wear strips and chain was determined by tethering to a stationary strain gauge a sled supported on two parallel 4 inch long runners of ultrahigh molecular weight polyethylene wear strip material. The total mass of the sled was 1790 g. The force exerted on the strain gauge during belt operation was recorded continuously every 60 seconds during operation using a computer.

Viscosity Test

The viscosity of the high viscosity oil or weakly amphipathic compound can be determined using the viscosity test described below and is generally straightforward if using a neat oil. But, if the high viscosity oil is emulsified or otherwise incorporated into a composition it is necessary to first isolate the oil phase. This is also necessary because high viscosity oils and especially high viscosity oils that contain weakly amphipathic compounds may entrain water. That is, there may be some solubility of water in high viscosity oils that are themselves not soluble in water. The viscosity of the water insoluble high viscosity oil or weakly amphipathic compounds may be determined by separating the oil and water phases by methods including breaking the emulsion by heating, by centrifugation, by evaporation of the aqueous phase, by breaking the emulsion by salting out, by breaking the emulsion by addition of a water miscible co-solvent or by a combination of these methods. If the water insoluble components are known from formulation, the high viscosity oil can be prepared as a neat substance for determination of viscosity. Once the high viscosity oil has been prepared or separated from an emulsion, it is preferable to measure the viscosity at 25° C. and low shear rates and after allowing the sample to "rest" for 12 hours, 18 hours or preferably 24 hours. Given the different methods of preparing the high viscosity oil for analysis, it is required that the resultant oil from at least one of them gives viscosity when measured as described above of greater than about 300 centipoise, greater than about 500 centipoise, or greater than about 1000 centipoise.

The emulsions are preferably caused to phase separate by heating or centrifugation because no adventitious materials are added which must be removed later and because water soluble lubricant constituents such as water soluble salts and compounds are removed with the aqueous layer. Co-solvents may also be used to remove adventitious water from the non-aqueous phase, as for example by azeotropic distillation. Preferable water miscible co-solvents for phase separation or removal of water have boiling points below about 90° C.

One exemplary phase separation technique includes heating an emulsion to 80° C. or diluting the emulsion with an equal weight amount of ethanol and then heating to 65° C. in a closed container. The non-aqueous phase is then removed from the aqueous phase by separation in a separation funnel. If the non-aqueous phase entrains either water or ethanol (evident by a cloudy appearance or determination of greater than about 2% water by Karl Fischer titration), water and ethanol can be removed by distillation. Accordingly, 15 g of the non-aqueous phase is poured in a slow stream into 200 g of anhydrous ethanol and then the mixture is evaporated to dryness on a rotary evaporator at 90° C. in vacuo to yield a clear, water insoluble oil. The non-aqueous phase is then allowed to rest for approximately 18 to 24 hours at approximately 20° C. and then the viscosity is measured on a Bohlin CVO 120 High Resolution rheometer at 25° C. using a parallel plate geometry with plate diameter=20 mm, gap=0.25 mm, and integrated average shear rate of 5.9 sec$^{-1}$. For determining whether the oil is Newtonian or non-Newtonian, the viscosity can be measured over a range of shear rates including 3.0 sec$^{-1}$, 3.8 sec$^{-1}$, 4.7 sec$^{-1}$, 5.9 sec$^{-1}$, 7.4 sec$^{-1}$, 9.2 sec$^{-1}$, 11.6 sec$^{-1}$, 14.5 sec$^{-1}$, and 18.1 sec$^{-1}$. Viscosity is measured at each shear rate in ascending order and each value is the average from a 30 second measurement period. There should be a 30 second pause between each subsequent measurement at successively higher shear rates.

Particle Size Test

The particle size of dispersed oil can be determined using static light scattering particle size analyzers, for example using a Horiba LA-920 particle size analyzer.

Comparative Example A

Dry Application of Emulsion of Alcohol Ethoxylate and Weakly Amphipathic Fatty Amine Compounds 753 g of oleyl propylene diamine (Duomeen OL, available from Akzo Nobel Surfactants, Chicago, Ill.) and 300 g coco alkyl propylene diamine (Duomeen CD, available from Akzo Nobel Surfactants, Chicago, Ill.) were mixed and warmed slightly to produce a clear solution. This was poured into a stirring solution of 7400 g of deionized water plus 400 g glacial acetic acid to produce a clear, light yellow solution. To this, 598 g of oleyl-nine mole ethoxylate-carboxylic acid (Akypo RO 90 VG surfactant, available from Kao Chemicals, GmbH, Emmerich, Germany) was added and stirring was continued for 20 minutes at which point the solution was again a clear, light yellow solution. Then 550 g of 50% NaOH was added over the course of about two minutes to give a viscous beige colored dispersion with a pH=10.43.

The viscosity of the dispersed non-aqueous phase of the emulsion was determined by heating the emulsion to 80° C. overnight to cause phase separation, and the resulting upper, clear yellow layer was collected and allowed to stand at room temperature for one day before measuring viscosity. When analyzed using a Computrac Vapor Pro Moisture Analyzer (available from Arizona Instrument, Tempe Ariz.), the water content of the non-aqueous phase was determined to be 67%. The viscosity of the non-aqueous phase as a function of shear rate is shown in Table 1. Over the shear rate range from 3.0 sec$^{-1}$ to 18.1 sec$^{-1}$, the viscosity varied by a factor of 1.70 (highest viscosity in the series divided by the lowest viscosity in the series). Therefore, the non-aqueous dispersed phase of the emulsion is characterized as non-Newtonian.

TABLE 1

| Shear Rate 1/s | Viscosity [cP] |
|---|---|
| 3.0 | 5024 |
| 3.8 | 4144 |
| 4.7 | 3861 |
| 5.9 | 3820 |
| 7.4 | 3875 |
| 9.2 | 4011 |
| 11.5 | 4388 |
| 14.5 | 5247 |
| 18.1 | 6461 |

In a separate experiment, water was removed from the non-aqueous phase by azeotropic distillation using ethanol. The clear yellow upper layer (9.5 g) was added dropwise to 40 mL of anhydrous ethanol and the resulting inhomogeneous liquid was is evaporated to dryness on a rotary evaporator at 90° C. in vacuo to yield a clear yellow liquid. The process of adding dropwise to ethanol and rotary evaporating was repeated to give a clear yellow liquid which had 16% water as determined by Vapor Pro analysis. The viscosity of the dried non-aqueous phase as a function of shear rate is shown in Table 2. Over the shear rate range from 3.0 sec$^{-1}$ to 18.1 sec$^{-1}$, the viscosity varied by a factor of 1.69, that is, the non-aqueous dispersed phase of the emulsion after separation and drying is characterized as non-Newtonian.

TABLE 2

| Shear Rate 1/s | Viscosity [cP] |
|---|---|
| 3.0 | 1816 |
| 3.8 | 1576 |
| 4.7 | 1550 |
| 5.9 | 1482 |
| 7.4 | 1323 |
| 9.2 | 1250 |
| 11.5 | 1144 |
| 14.5 | 1071 |
| 18.1 | 1183 |

The dispersion was microfluidized by processing using a M-110Y Microfluidizer® Processor microfluidizer equipped with a P30Y (200 micron) shear chamber followed by a H210Z (200 micron) shear chamber (product of Microfluidics, Newton, Mass.) with an operation pressure of approximately 5000 psi to give a clear, low viscosity, yellow, slightly hazy solution. When measured using a Horiba 920 particle size analyzer, the volume average particle size of the emulsion was determined to be 0.1473 microns and the number of average particle size was 0.0927 microns. The microfluidized emulsion contained 7.5 weight % Duomeen OL, 3.0 weight % Duomeen CD, and 6.0 weight % Akypo RO 90 VG.

The lubrication and cleanliness properties of the lubricant emulsion applied in a dry mode were evaluated as described above in a 20-hour experiment. Microfluidized emulsion (3000 g) was diluted with 7000 g of deionized water to give a lubricant emulsion containing 2.25 weight % Duomeen OL, 0.90 weight % Duomeen CD, and 1.80 weight % Akypo RO 90 VG. The lubricant emulsion was sprayed from nozzles operating at 36-44 psi (delivering approximately 60-80 g of lubricant per minute). At the start of the 20 hours, the lubricant composition was sprayed for 30 seconds and then not sprayed for 42.5 minutes, and the cycle was repeated a total of 28 times. In this experiment the ratio of non-application time to application time was 85:1. Over the course of the 20 hour experiment, the total application time was 840 seconds, the sprayed volume of lubricant emulsion was 980 mL, and the mass of applied Duomeen OL was 22.1 g per track. The average COF (averaged over the last four hours of operation) between bottles and ferritic track was 0.104, between bottles and austenitic track was 0.101, between the wear strip sled and ferritic track was 0.263, and between the wear strip sled and austenitic track was 0.262. At the end of the experiment, the upper surface of the conveyor appeared fairly clean, however, there were very large amounts of black greasy residue on the bottles, sleds, and between links of the conveyor belt. What this experiment shows is that an emulsion of a mixture of weakly amphipathic fatty diamines plus alcohol ethoxylate carboxylate with a highly viscous, non-Newtonian dispersed phase produces an unacceptably large amount of soil when run under relatively "dry" conditions (relatively higher concentration and smaller dispensed lubricant emulsion volume).

Example 1

Semi-Dry Application of an Emulsion of Alcohol Ethoxylate Carboxylate and Weakly Amphipathic Fatty Amine Compounds The microfluidized emulsion prepared as described above (100 g) was diluted with 9900 g of deionized water to give a dilute lubricant emulsion containing 0.075 weight % Duomeen OL, 0.030 weight % Duomeen CD, and 0.060 weight % Akypo RO 90 VG. The lubrication and cleanliness properties of the dilute lubricant emulsion were evaluated as described above in a 20 hour experiment in which the diluted emulsion was sprayed from nozzles operating at 36-44 psi (delivering approximately 60-80 g of lubricant per minute). At the start of the 20 hours, the dilute lubricant composition was sprayed for 5 minutes to thoroughly wet the track followed by 2.3 minutes of non-application. Subsequently, the dilute lubricant composition was sprayed for 30 seconds and then not sprayed for 138 seconds, and this cycle was repeated a total of 426 times. In this experiment the ratio of non-application time to application time was 4.6:1. Over the course of the 20 hour experiment, the total application time was 13,080 seconds, the sprayed volume of lubricant emulsion was 15,260 mL, and the mass of applied Duomeen OL was 11.5 g per track. The average COF (averaged over the last four hours of operation) between bottles and ferritic track was 0.170, between bottles and austenitic track was 0.175, between the wear strip sled and ferritic track was 0.113, and between the wear strip sled and austenitic track was 0.164.

At the end of the experiment, the upper surface of the conveyor was moderately soiled and there was no black greasy residue on the bottles, sleds, or between the links of the conveyor belt. What this experiment shows is that an emulsion of a highly viscous mixture of fatty diamines plus alcohol ethoxylate carboxylate produces an acceptably smaller amount of soil when run under relatively "semi-dry" conditions (relatively lower concentration and greater dispensed volume) and exhibits lower coefficient of friction between flat components in sliding contact, that is, lower coefficient of friction between wear strips and chain.

Comparative Example B

Dry Application of an Emulsion of a Water Dispersible Phosphate Ester Compound 352 g of oleocetyl five mole ethoxylate phosphate ester (Rhodafac PA/35, available from Clariant Corporation, Mount Holly N.J.) was added to 3150 g of deionized water to give a moderately viscous translucent beige colored emulsion with 10.0 weight % Rhodafac PA/3 5.

The viscosity as a function of shear rate of Rhodafac PA/35 before adding to deionized water is shown in Table 3. According to the technical data sheet, Rhodafac PA/35 contains less than 2% water. Over the shear rate range from 3.0 sec$^{-1}$ to 18.1 sec$^{-1}$, the viscosity varied by a factor of 1.71. Thus, the non-aqueous dispersed phase of the emulsion is characterized as non-Newtonian.

TABLE 3

| Shear Rate 1/s | Viscosity [cP] |
|---|---|
| 3.0 | 4586 |
| 3.8 | 3755 |
| 4.7 | 3504 |
| 5.9 | 3352 |
| 7.4 | 3263 |
| 9.2 | 3128 |
| 11.5 | 2954 |
| 14.5 | 2767 |
| 18.1 | 2675 |

The resulting emulsion was too viscous to give a fan spray pattern when sprayed from nozzles operating at about 36-44 psi and so 3000 g of it were diluted with 3000 g of deionized water to give an lubricant emulsion containing 5.0 weight % Rhodafac PA/35. When measured using a Horiba 920 particle size analyzer, the volume average particle size of the emulsion was determined to be 0.1645 microns and the number of average particle size was 0.1059 microns. The lubricant emulsion was sprayed from nozzles operating at 36-44 psi (delivering approximately 60-80 g of lubricant per minute). At the start of the 20 hours, the lubricant composition was sprayed for 15 seconds and then not sprayed for 59.75 minutes, sprayed again for 15 seconds and then not sprayed for 59.75 minutes, subsequently was sprayed for 15 seconds and then not sprayed for 179.75 minutes. The cycle of spraying for 15 seconds and then not spraying for 179.75 minutes was repeated five more times for a total of 6 times. In this experiment the total application time of lubricant emulsion was 120 seconds, the total non-application time was 1198 minutes, the ratio of non-application time to application time was 599:1, the sprayed volume of lubricant emulsion was 140 mL, and the mass of applied Rhodafac PA/35 was 7.0 g per track. The average COF (averaged over the last four hours of operation) between bottles and ferritic track was 0.158, between bottles and austenitic track was 0.158, between the wear strip sled and ferritic track was 0.555, and between the wear strip sled and austenitic track was 0.428. At the end of the experiment, the upper surface of the conveyor appeared moderately clean, however, as in the case of Comparative Example A, there were large amounts of black greasy residue on the bottles, sleds, and between links of the conveyor belt. What this experiment shows is that an emulsion of a weakly amphipathic phosphate ester compound with a highly viscous, non-Newtonian dispersed phase produces provides an unacceptably high COF between wear strips and chain links and an unacceptably large amount of soil when run under relatively "dry" conditions (relatively higher concentration and smaller dispensed lubricant emulsion volume).

Example 2

Semi-Dry Application of an Emulsion of a Water Dispersible Phosphate Ester Compound The emulsion containing 10.0 weight % Rhodafac PA/35 prepared as described above (167 g) was diluted with 9833 g of deionized water to give a dilute lubricant emulsion containing 0.167 weight % Rhodafac PA/35. The lubrication and cleanliness properties of the dilute lubricant emulsion were evaluated as described above in a 20 hour experiment in which the diluted emulsion was sprayed from nozzles operating at 36-44 psi (delivering approximately 60-80 g of lubricant per minute). At the start of the 20 hours, the dilute lubricant composition was sprayed for 5 minutes to thoroughly wet the track followed by 5.0 minutes of non-application. Subsequently, the dilute lubricant emulsion was sprayed for 15 seconds and then not sprayed for 345 seconds, and this cycle was repeated a total of 198 times. In this experiment the total application time was 3270 seconds, the total non-application time was 1144 minutes, the ratio of non-application time to application time was 21.0:1 and the mass of applied Rhodafac PA/35 was 6.4 g per track. The average COF (averaged over the last four hours of operation) between bottles and ferritic track was 0.241, between bottles and austenitic track was 0.136 between the wear strip sled and ferritic track was 0.220, and between the wear strip sled and austenitic track was 0.438.

At the end of the experiment, the upper surface of the conveyor was lightly soiled and there was no black greasy residue on the bottles, sleds, or between the links of the conveyor belt. What this experiment shows is that an emulsion of a highly viscous phosphate ester compound produces an acceptably smaller amount of soil when run under relatively "semi-dry" conditions (relatively lower concentration and greater dispensed volume) and exhibits lower coefficient of friction between flat components in sliding contact, that is, lower coefficient of friction between wear strips and chain.

Comparative Example C

Dry Application of an Emulsion of an Alcohol Ethoxylate Carboxylate and Water Dispersible Phosphate Ester Compound 80 g of oleyl four mole ethoxylate phosphate ester (Lubrhophos LB-400, available from Clariant Corporation, Mount Holly N.J.) plus 80 g of Akypo RO 90 VG was warmed to about 80° C. by microwave heating to give a clear light amber liquid which was added to 1840 g of deionized water to give a moderately viscous viscoelastic translucent beige colored emulsion with 4.0 weight % Lubrhophos LB-400 and 4.0 weight % Akypo RO 90 VG.

The viscosity as a function of shear rate of the Lubrhophos LB-400 plus Akypo RO 90 VG before adding to deionized water is shown in Table 4. Over the shear rate range from 3.0 sec$^{-1}$ to 18.1 sec$^{-1}$, the viscosity varied by a factor of 5.43. Therefore, the non-aqueous dispersed phase of the emulsion is characterized as non-Newtonian.

TABLE 4

| Shear Rate 1/s | Viscosity [cP] |
|---|---|
| 3.0 | 2010 |
| 3.8 | 1614 |
| 4.7 | 1312 |
| 5.9 | 1065 |
| 7.4 | 866 |
| 9.2 | 695 |
| 11.5 | 566 |
| 14.5 | 457 |
| 18.1 | 370 |

The resulting emulsion was too viscous to give a fan spray pattern when sprayed from nozzles operating at about 36-44 psi and so 2000 g of it was diluted with 2000 g of deionized water to give an lubricant emulsion containing 2.0 weight % Lubrhophos LB-400 and 2.0 weight % Akypo RO 90 VG. When measured using a Horiba 920 particle size analyzer, the volume average particle size of the emulsion was determined to be 0.1500 microns and the number of average particle size was 0.1256 microns. The viscosity of the emulsion was measured using a Brookfield LV viscometer and a S01 spindle at 50 rpm and determined to be 18.0 centipoise. The lubricant emulsion was sprayed from nozzles operating at 36-44 psi (delivering approximately 60-80 g of lubricant per minute). At the start of the 20 hours, the lubricant composition was sprayed for 5 minutes and then not sprayed for 10 minutes, sprayed again for 30 seconds and then not sprayed for 42.35 minutes. The cycle of spraying for 30 seconds and then not spraying for 42.35 minutes was repeated 27 more times for a total of 28 times. In this experiment the total application time of lubricant emulsion was 1140 seconds, the total non-application time was 1181 minutes, the ratio of non-application time to application time was 62:1, the sprayed volume of lubricant emulsion was 1330 mL, and the mass of applied Lubrhophos LB-400 was 26.6 g per track. The average COF (averaged over the last four hours of operation) between bottles and ferritic track was 0.089, between bottles and austenitic track was 0.074, between the wear strip sled and ferritic track was 0.440, and between the wear strip sled and austenitic track was 0.109. At the end of the experiment, the upper surface of the conveyor appeared moderately clean, however, as in the case of Comparative Examples A and B, there were large amounts of black greasy residue on the bottles. What this experiment shows is that an emulsion of a water insoluble phosphate ester plus alcohol ethoxylate carboxylate with a highly viscous, non-Newtonian dispersed phase produces an unacceptably high COF between wear strips and ferritic alloy chain links and an unacceptably large amount of soil when run under relatively "dry" conditions (relatively higher concentration and smaller dispensed lubricant emulsion volume).

Example 3

Semi-dry Application of an Emulsion of an Alcohol Ethoxylate Carboxylate and Water Dispersible Phosphate Ester Compound The emulsion containing 4.0 weight % Lubrhophos LB-400 and 4.0 weight % Akypo RO 90 VG prepared as described above (167 g) was diluted with 9833 g of deionized water to give a dilute lubricant emulsion containing 0.0668 weight % Lubrhophos LB-400 and 0.0668 weight % Akypo RO 90 VG. The lubrication and cleanliness properties of the dilute lubricant emulsion were evaluated as described above in a 20 hour experiment in which the diluted emulsion was sprayed from nozzles operating at 36-44 psi (delivering approximately 60-80 g of lubricant per minute). At the start of the 20 hours, the dilute lubricant composition was sprayed for 5 minutes to thoroughly wet the track followed by 2.3 minutes of non-application. Subsequently, the dilute lubricant emulsion was sprayed for 30 seconds and then not sprayed for 138 seconds, and this cycle was repeated a total of 426 times. In this experiment the total application time was 218 minutes, the total non-application time was 982 minutes, the ratio of non-application time to application time was 4.5:1 and the mass of applied Lubrhophos LB-400 was 10.2 g per track. The average COF (averaged over the last four hours of operation) between bottles and ferritic track was 0.217, between bottles and austenitic track was 0.235, between the wear strip sled and ferritic track was 0.206, and between the wear strip sled and austenitic track was 0.120. At the end of the experiment, the upper surface of the conveyor was moderately soiled and there was no black greasy residue on the bottles, sleds, or between the links of the conveyor belt. What this experiment shows is that an emulsion of a highly viscous mixture of phosphate ester compound plus alcohol ethoxylate carboxylate produces an acceptably smaller amount of soil when run under relatively "semi-dry" conditions (relatively lower concentration and greater dispensed volume) and exhibits lower coefficient of friction between flat components in sliding contact, that is, lower coefficient of friction between wear strips and chain.

Comparative Example D

Silicone Emulsion

This comparative example used DryExx™, a silicone and fatty amine based lubricant, commercially available from Ecolab Inc., St. Paul, Minn. DryExx™ was tested using the Lubricity Test using a glass bottle package on a stainless steel conveyor belt. When applied in a "dry" mode the coefficient of friction went above 0.25 and in combination with water spillage the bottles crashed immediately.

The viscosity of the silicone oil as a function of shear rate was determined for a typical food grade silicone oil (Dow Corning 200 fluid 300 cSt) and the results are shown in Table 5. Over the shear rate range from 3.0 sec$^{-1}$ to 18.1 sec$^{-1}$, the viscosity varied by a factor of 1.08, that is, the non-aqueous dispersed phase of the emulsion is characterized as Newtonian.

TABLE 5

| Shear Rate 1/s | Viscosity [cP] |
|---|---|
| 3.0 | 224 |
| 3.8 | 222 |
| 4.7 | 226 |
| 5.9 | 229 |
| 7.4 | 234 |
| 9.2 | 236 |
| 11.5 | 238 |
| 14.5 | 239 |
| 18.1 | 241 |

The viscosity of the dispersed non-aqueous phase of a food grade silicone emulsion was determined by removing water from Lambent E2140FG emulsion to by azeotropic distillation using ethanol. Lambent E2140FG emulsion (15 g) was added dropwise to 200 g of anhydrous ethanol and the resulting inhomogeneous liquid was is evaporated to dryness on a rotary evaporator at 80° C. in vacuo to yield a hazy white liquid. Additional anhydrous ethanol (100 g) was added to the residue and the process of rotary evaporation repeated two times yielding a slightly hazy white liquid plus slightly yellowish droplets of a second immiscible phase. The slightly yellowish second phase was soluble in water and the slightly hazy white phase was immiscible with water. The slightly hazy white water insoluble oil was collected and determined to have 0.06% water as determined by Vapor Pro analysis. The viscosity of the water insoluble oil was measured giving the results shown in Table 6. Over the shear rate range from 3.0 sec$^{-1}$ to 18.1 sec$^{-1}$, the viscosity varied by a factor of 1.07. Therefore, the non-aqueous dispersed phase of the emulsion is characterized as Newtonian.

TABLE 6

| Shear Rate 1/s | Viscosity [cP] |
| --- | --- |
| 3.0 | 265 |
| 3.8 | 261 |
| 4.7 | 260 |
| 5.9 | 270 |
| 7.4 | 276 |
| 9.2 | 277 |
| 11.5 | 272 |
| 14.5 | 275 |
| 18.1 | 275 |

The invention has been described with reference to various specific and preferred embodiments and techniques. However, it should be understood that many variations and modifications may be made while remaining within the spirit and scope of the invention.

We claim:

1. A method for lubricating the passage of a container along a conveyor, comprising:
    applying a lubricating emulsion to at least a portion of a container-contacting surface of the conveyor or to at least a portion of a conveyor-contacting surface of the container, the lubricating emulsion comprising:
        (a) 0.01% to about 0.35% of a water insoluble oil with a viscosity greater than about 300 centipoise comprising of one or more water insoluble phosphate esters selected from the group consisting of oleyl-$(EO)_4OPO_3H_2$, oleocetyl-$(EO)_5OPO_3H_2$ and mixtures thereof, wherein EO represent ethylene oxide;
        (b) about 0 to about 0.35 wt-% emulsifier; and
        (c) about 99.3 to about 99.99 wt-% water, inclusive of any hydrophilic diluents;
    wherein the lubricant emulsion has a pH from 8 to 14;
    wherein the lubricating emulsion is applied for a period of time and not applied for a period of time and the ratio of not applied: applied time is between 2:1 and 32:1, and
    wherein the not applied time is 12 minutes or less.

2. The method of claim 1, wherein the water insoluble oil has a viscosity of at least about 300 centipoise when measured with a parallel plate rheometer with 20 mm plate diameter and 0.25 mm plate separation at an integrated average shear rate of 5.9 $sec^{-1}$.

3. The method of claim 1, wherein the water insoluble oil further comprises water insoluble unacidified fatty amine compounds.

4. The method of claim 1, wherein the water insoluble oil is emulsified with the emulsifier, and the resulting emulsion has a particle size from about 0.05 to about 5 microns.

5. The method of claim 1, wherein the applying comprises spraying the composition through a non-energized nozzle.

6. The method of claim 1, wherein applying comprises applying the lubricating emulsion for a first length of time and not applying it for a second length of time; wherein the ratio of the first length to the second length is about 1 to greater than or equal to about 10.

7. The method of claim 1, wherein the emulsion further comprises an additional component.

8. The method of claim 1, wherein the emulsion maintains a coefficient of friction of less than about 0.4 over the entire period of use.

9. The method of claim 1, wherein the container comprises polyethylene terephthalate, polyethylene naphthalate, polyethylene, polypropylene, paper board, glass, or metal.

10. The method of claim 1, wherein applying the lubricant use solution maintains a coefficient of friction below 0.2 during the not applied time.

11. The method of claim 1, wherein the water insoluble oil has a viscosity greater than 500 centipoise.

12. The method of claim 1, wherein the water insoluble oil has a viscosity greater than 1000 centipoise.

13. The method of claim 1, wherein the emulsifier comprises two or more emulsifiers with different HLB values.

14. The method of claim 1, wherein the emulsifier comprises ether carboxylic acids with linear or branched chain with greater than 6 carbon atoms.

15. The method of claim 1, wherein the lubricant emulsion does not phase separate in one month at 4 to 50° C.

* * * * *

UNITED STATES PATENT AND TRADEMARK OFFICE
CERTIFICATE OF CORRECTION

PATENT NO. : 10,260,020 B2  
APPLICATION NO. : 15/861926  
DATED : April 16, 2019  
INVENTOR(S) : Seemeyer et al.

Page 1 of 1

It is certified that error appears in the above-identified patent and that said Letters Patent is hereby corrected as shown below:

On the Title Page

(72) Inventors: "Jeffrey S. Hutchinson," should read --Jeffrey S. Hutchison,--

Signed and Sealed this  
Twenty-fourth Day of September, 2019

Andrei Iancu  
*Director of the United States Patent and Trademark Office*